US012688539B2

(12) United States Patent
Hasnain et al.

(10) Patent No.: US 12,688,539 B2
(45) Date of Patent: Jul. 21, 2026

(54) TABLESIDE AI WAITER FOR PERSONALIZED GUEST EXPERIENCE

(71) Applicants: Zia Hasnain, San Jose, CA (US); Umair Arshad, Islamabad (PK); Syed Fakhir Ali, Islamabad (PK); Hira Ahmed, Islamabad (PK); Asad Bin Saif, Islamabad (PK); Muhammad Saud Tahir, Islamabad (PK); Muhammad Wisal Khan, Islamabad (PK); Alexander Thomas Hult, San Jose, CA (US)

(72) Inventors: Zia Hasnain, San Jose, CA (US); Umair Arshad, Islamabad (PK); Syed Fakhir Ali, Islamabad (PK); Hira Ahmed, Islamabad (PK); Asad Bin Saif, Islamabad (PK); Muhammad Saud Tahir, Islamabad (PK); Muhammad Wisal Khan, Islamabad (PK); Alexander Thomas Hult, San Jose, CA (US)

(73) Assignee: AIOAPP Inc., San Jose, CA (US)

( * ) Notice: Subject to any disclaimer, the term of this patent is extended or adjusted under 35 U.S.C. 154(b) by 0 days.

(21) Appl. No.: 18/963,755

(22) Filed: Nov. 28, 2024

(65) Prior Publication Data

US 2026/0162195 A1     Jun. 11, 2026

Related U.S. Application Data

(63) Continuation of application No. 29/922,206, filed on Dec. 21, 2023.

(Continued)

(51) Int. Cl.
   *G06Q 50/12* (2012.01)
   *G06F 40/295* (2020.01)
   (Continued)

(52) U.S. Cl.
   CPC ........... *G06Q 50/12* (2013.01); *G06F 40/295* (2020.01); *G06F 40/30* (2020.01);
   (Continued)

(58) Field of Classification Search
   CPC ........................ G06Q 50/12; G06Q 30/06311; G06F 40/295; G06F 40/30; G06V 40/172; G10L 15/22; G10L 15/26
   (Continued)

(56) References Cited

U.S. PATENT DOCUMENTS

2020/0273089 A1*   8/2020   Siefken .............. G06Q 30/0635
2022/0165262 A1*   5/2022   Sumpter ........... G06Q 10/0631
   (Continued)

OTHER PUBLICATIONS

Lambora, Annu et al. Implementation of Wireless Menu Using IoT. 2019 International Conference on Machine Learning, big Data, Cloud and Parallel Computing (COMITCon), 2019. (Year: 2019).*

*Primary Examiner* — Fawaad Haider

(57) ABSTRACT

The present disclosure pertains to a Tableside AI Device capable of replacing various duties performed by human helpers in the hospitality or retail industries. These powerful devices leverage microphone(s), camera(s), tablet processor, cloud computing, artificial intelligence, and computer vision technologies to perform various tasks including onboarding new customers; identifying returning customers; showcasing a comprehensive catalog of offerings for establishments like restaurants, bars, hotels, resorts, and retail outlets; capturing and storing customer preferences, allergies, and specific requirements; managing and fulfilling customer orders, requests, and instructions from the provided catalog; present targeted advertisements to users; offer real-time updates to customers regarding the status of their orders, requests, or instructions.

32 Claims, 20 Drawing Sheets

Related U.S. Application Data

(60) Provisional application No. 63/573,510, filed on Apr. 3, 2024, provisional application No. 63/573,509, filed on Apr. 3, 2024, provisional application No. 63/561,799, filed on Mar. 6, 2024, provisional application No. 63/561,809, filed on Mar. 6, 2024, provisional application No. 63/561,805, filed on Mar. 6, 2024, provisional application No. 63/607,574, filed on Dec. 8, 2023.

(51) Int. Cl.

| | | |
|---|---|---|
| *G06F 40/30* | (2020.01) | |
| *G06Q 30/0601* | (2023.01) | |
| *G06V 40/16* | (2022.01) | |
| *G10L 15/22* | (2006.01) | |
| *G10L 15/26* | (2006.01) | |

(52) U.S. Cl.
CPC ..... *G06Q 30/06311* (2025.08); *G06V 40/172* (2022.01); *G10L 15/22* (2013.01); *G10L 15/26* (2013.01)

(58) Field of Classification Search
USPC .......................................................... 705/15
See application file for complete search history.

(56) References Cited

U.S. PATENT DOCUMENTS

| | | | | |
|---|---|---|---|---|
| 2023/0107944 A1* | 4/2023 | Xiao | ..................... | G06F 40/186 704/9 |
| 2023/0289530 A1* | 9/2023 | Aung | ..................... | G06F 40/35 |

* cited by examiner

Wake-word/Hotword module 1300

1603  | Calculate Probability of a User buying any item

Let $C_1, C_2, C_3$ be the categories, $U_1, U_2, U_3$ be the users, and $I_1, I_2, I_3$ be the items.

Define the membership vectors as follows:

$$V_1 = \begin{bmatrix} 1 \\ 1 \\ 0 \end{bmatrix} \quad \text{for } I_1 \in C_1 \text{ and } I_1 \in C_2$$

$$V_2 = \begin{bmatrix} 0 \\ 1 \\ 0 \end{bmatrix} \quad \text{for } I_2 \in C_2$$

$$V_3 = \begin{bmatrix} 0 \\ 0 \\ 1 \end{bmatrix} \quad \text{for } I_3 \in C_3$$

For a specific user $U_1$, let the ratings be given by:

$$P(C_1|U_1) = 60\%, \quad P(C_2|U_1) = 20\%, \quad P(C_3|U_1) = 20\%$$

To calculate the probability of a person buying an item $I_1$, denoted as $P(\text{Buy } I_1|U_1)$, we can use the dot product:

$$P(\text{Buy } I_1|U_1) = V_1 \cdot \begin{bmatrix} P(C_1|U_1) \\ P(C_2|U_1) \\ P(C_3|U_1) \end{bmatrix}$$

In this case, substituting the given values:

$$P(\text{Buy } I_1|U_1) = \begin{bmatrix} 1 \\ 1 \\ 0 \end{bmatrix} \cdot \begin{bmatrix} 60\% \\ 20\% \\ 20\% \end{bmatrix} = 80\%$$

FIG. 17

TABLESIDE AI WAITER FOR PERSONALIZED GUEST EXPERIENCE

CROSS-REFERENCE TO RELATED APPLICATIONS

The present patent application is a continuation of U.S. Provisional Patent Application Ser. No. 63/607,574, filed on Dec. 12, 2023, and U.S. Design patent application Ser. No. 29/922,206, filed on Dec. 21, 2023, U.S. Provisional Patent Application Ser. No. 63/561,799, filed on Mar. 6, 2024, U.S. Provisional Patent Application Ser. No. 63/561,805, filed on Mar. 6, 2024, U.S. Provisional Patent Application Ser. No. 63/561,809, filed on Mar. 6, 2024, U.S. Provisional Patent Application Ser. No. 63/573,509, filed on Apr. 3, 2024, U.S. Provisional Patent Application Ser. No. 63/573,510 filed on Apr. 3, 2024, which are incorporated by reference herein in their entirety and for all purposes as if completely and fully set forth herein.

FIELD OF INVENTION

The present invention relates to the field of tableside assistants, tableside ordering, technology, artificial intelligence, and the hospitality industry.

BACKGROUND

As the world transitions towards automation, global technological advancements continuously prove to be an impetus for creating new systems and improved processes. These innovative tech-enabled systems and processes have disrupted—for the better—various industries such as medicine, health, law, energy, etc. The hospitality industry should remain no exception. Currently, restaurants, bars, hotels, and the retail industry rely heavily on human interaction to accommodate their guests or customers. For instance, in restaurants, human waiters escort guests from reception to the table, guide them through the menu, make recommendations, take orders, implement changes to orders, and collect payments. Similarly, in the hospitality industry, humans receive guests at the hotel, assist with room reservations, escort guests to and transport their luggage to rooms, and quickly attend to guests' needs during their stay. In the retail industry, human staff attend to customer questions, help find items in the aisles, process payments, and pack the items purchased. While human support or services entirely cannot be replaced, various aspects of such support or services can be automated for improved efficiency. This automation allows human resources a better work-life balance and also helps them to focus on other important tasks of their job. A need exists in the hospitality industry for an automated Tableside AI Device capable of attending to various requests of guests or customers. For example, a Tableside AI Device in a restaurant capable of taking orders from guests in the same manner as human waiters or a Tableside AI Device in hotel rooms that efficiently attends to the requests of the guest i.e. room service. The order or request is forwarded to the kitchen or hotel management for processing. These automated AI devices, capable of rendering similar user experiences as those provided by humans, help improve efficiency.

SUMMARY OF THE INVENTION

This summary provides a simplified form of concepts that are further described below in the detailed description. This summary is not intended to identify key or essential features and should therefore not be used for determining or limiting the scope of the claimed subject matter.

In 2021, 75% of restaurant owners considered recruitment and retention of employees as their top challenge as per the survey conducted by the National Restaurant Association in the US. As per a survey conducted by the American Hotels and Lodging Association (AHLA) in 2022, 82% of survey respondents faced a staffing shortage; whereas, 26% experienced severe shortages that directly affected the hotel's operational capacity. In January 2023, 79% of survey participants conducted by AHLA reported staffing shortages. This known shortage of human staff and acknowledged recruitment/retention challenges in the US hospitality industry act as an impediment to providing an elevated guest experience. While working at their full capacity, the shortage causes the existing workforce to burn out, adversely affecting guest experiences. Similarly, a worker's absence for medical, personal, or other reasons also leaves the restaurant owner with a temporary shortage of staff, which in turn affects the experience. Restaurants, cafes, bars, clubs, hotels, resorts, and retail stores, collectively all stakeholders in the hospitality industry, can reduce costs and improve efficiency by automating various aspects of the customer (or guest) journey through Tableside AI Devices. These devices, inter alia, leverage and innovatively amalgamate artificial intelligence, cloud computing, and mesh-neural-network connectivity to—without limitation—sign up new customers; recognize returning customers; display a catalog of items for restaurants, bars, hotels, resorts, and retail; record customer preferences, allergies, and requirements; process customer's orders, requests and instructions from the catalog of items; display advertisements; provide real-time updates to customers about their order, request or instruction; record manual and AI-enabled automated reviews; assess table turnover; notify the attendants to automatically clean the table surfaces at restaurants or bars, rooms of hotel or resorts or aisle of a retail store; refill or resupply items requested from the catalog of items and prevent the Tableside AI Device from being stolen or removed unauthorizedly.

BRIEF DESCRIPTION OF THE DRAWINGS

The systems, methods, and computer program products disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 17 is the equation deployed to calculate the probabilities for recommendation in the invention's AI-enabled Recommendation System.

DETAILED DESCRIPTION OF THE INVENTION

Figure 1:
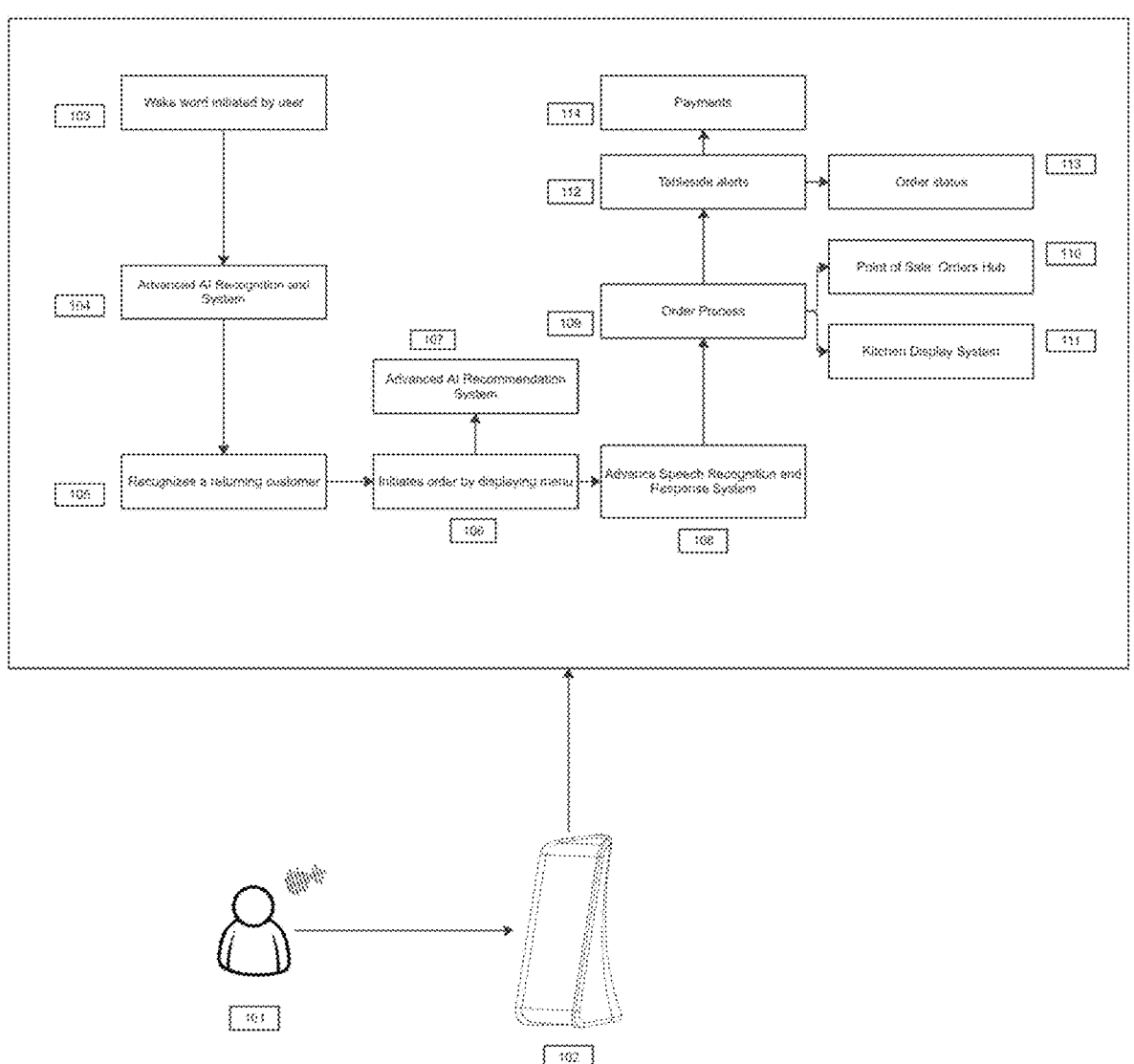
FIG. 1—illustrates the high-level diagram of various systems, methods, and computer programs integrated with the invention to automate various aspects of the user ordering journey in a restaurant setting.

In the following detailed description, numerous specific details are set forth by way of examples in order to provide a thorough understanding of the relevant teachings. However, it must be apparent to individuals skilled in the art that the present teachings may be practiced without such details. In other instances, well-known methods, procedures, and components have been described at a relatively high level, without detail, in order to avoid unnecessarily obscuring aspects of the present invention. Several descriptive terms and phrases are used in describing the various embodiments of this disclosure. These descriptive terms and phrases are used to convey generally agreed-upon meaning to those skilled in the art unless a different definition is given in this specification.

The present disclosure pertains to systems, methods, and computer program products in various embodiments for utilizing audio and visual data of the guests in the hospitality industry to perform various functions or services ordinarily performed by human helpers. The present disclosure may take the form of entirely a hardware embodiment, entirely a software embodiment (executed on hardware), entirely an Artificially Intelligent (AI) embodiment (integrated with software executed on hardware), or an embodiment combining AI, software, and hardware aspects that may all generally be referred to herein as a 'Model', 'Device', 'Engine', 'Module', 'Component' or 'System'. A component of executable code may be a single instruction, or many instructions, and may even be distributed over several different code segments, among different programs, and across several memory devices. The operational data may be identified and illustrated herein within components and may be embodied in any suitable form and organized within any suitable type of data structure. The operational data may be collected as a single data set or may be distributed over different locations including over different storage devices. The data may be structured (e.g. tables, relational database, etc.) and unstructured (e.g., language text, pictures, etc.). Where a component or portions of a component are implemented in software, the software portions are stored on one or more non-transitory computer-readable storage media. A computer-readable storage medium may be, for example, an electronic, magnetic, optical, electromagnetic, infrared, or semiconductor system, apparatus, or device, or any suitable combination of the foregoing. The computer-readable storage media may be non-transitory and may be persistent.

The Tableside AI Devices strategically deploy advanced technologies including (i) a microphone array as an audio receiver covering a radius of at least three (3) meters (ii) high-definition cameras measuring 720p to 1080p and covering a wide angle of 210 to 360 degrees for capturing videos and images (iii) a speaker to speak-out-loud responses generated by the System (iv) Natural Language Processing NLP-enabled voice recognition (v) video content processing face recognition (vi) a robust mesh network of interconnected devices, (vii) tablet receiver and processor and (viii) central AI-powered cloud processor and storage. The system deploys highly accurate facial recognition, tracking, feature extractions, and speech recognition components capable of being trained through machine learning models to recognize a wide variety of facial expressions, sentiments, vocabulary of words, associate tones, and other metadata, uniquely deployed in Video Content Analysis (VCA) and Speech-to-Text (STT) systems.

The present invention can be utilized in restaurants, bars, cafes, hotels, resorts, or retail; however, to better understand the preferred embodiment, it will be described in this patent application in the context of a dine-in restaurant whereby it automates the customer experience provided by a waiter. In this exemplary embodiment, the invention is configured to facilitate a customer's journey at a restaurant from the time of placing an order until the customer leaves. A customer interacts with the system according to embodiments through the microphone array and camera embedded in the Tableside AI Device. However, it is envisioned that the present system is otherwise configured to facilitate customer communication through a variety of electronic communication means including but not limited to touch screens.

The present disclosure pertains to the invention's Tableside AI Device and Components; Advanced Customer Recognition System and Modules; AI-Enabled Speech Recognition and Response System and Modules; AI-Enabled Recommendation System and Modules; Personalization Engine and Modules and the invention's ability to amalgamate AI, cloud computing and other technologies to automate a customer's ordering experience in a restaurant, process request in hotels/resorts and instructions in a retail store. However, the present invention contains other embodiments including the Tableside AI Audio and Visual Management System, Tableside AI Marketing System, Tableside AI Review System, and Tableside AI Device Protection and Monitoring System, all of which may form the subject matter of single or separate patent applications.

In the embodiment of the present disclosure, the database may contain a catalog of menu items and information pertaining to the customer's name, preferences, voice, face, and restrictions, profiled in the database. In this embodiment, the catalog of items will be presented in the form of a restaurant menu, which may list individual items such as food and drinks, attributes, calories, or prices that are obtained or imported from a Point-of-Sale (POS) system, a file containing structured text, a file containing unstructured text, or by scanning a physical copy of the menu and performing optical character recognition (OCR). The menu may also be generated based on user input provided through a graphical user interface. The menu displayed may be configured to communicate via video or audio or in a fixed form, which, based upon current technology, is preferably a menu display screen, for displaying, on one or more screens, a complete listing of all available menu items and options with their respective prices and other menu item information as desired. If payment components are embedded with or installed on the Tableside AI Device, they will preferably be positioned on the top of the Tableside AI Device for touch-and-go, tap-payment methods, or payment through a QR code as displayed on the touch screen.

FIG. 1 represents the high-level diagram of the system(s) embedded in the invention to automate various aspects of a user's journey in a restaurant. The user 101 is seated in a restaurant in front of the Tableside AI Device 102 (defined in FIG. 2). The user 101 interacts with the Tableside AI Device 102 through video and voice and activates the Tableside AI Device 102 through a wake word 103. Once the wake word is detected, the Advanced AI Recognition System 104 accurately identifies and detects a returning customer by innovatively amalgamating a range of recognition technologies such as voice recognition, face recognition, sound localization and recognition (U.S. Provisional Patent Application Ser. No. 63/607,574), NFC, Bluetooth ID, and geolocation tagging. Consequently, returning users are recognized 105; whereas, new users (unrecognized users) are directed toward the sign-up process. Thereafter, the ordering process is initiated. The restaurant's menu is displayed at 106. Here, the Advanced AI Recommendation System 107 utilizes the Personalization Engine to make personalized recommendations to the restaurant guests by utilizing various data points such as guest's order history, known allergies, chef's recommendations, popular menu items, weather, time, and occasion. In the meanwhile, customers' voice queries about the menu items or voice orders are directed to the Advanced AI Speech Recognition and Response System 108. The Advanced AI Speech Recognition and Response System 108 leverages the Speech Pathway Module, Transcription Module, Chatbot Module, Intent and Entity Classifier Module, Response Module, and Wake-word Module to accurately understand the user's speech and appropriately respond. After the guest's order is punched, the same is processed 109. The order is displayed on the Kitchen Display System (KDS) 111 and Point of Sale (POS) 110. In the meanwhile, the Tableside AI Device 102 keeps the user engaged with tableside alerts 112 and also provides information about order status 113 by relaying in real-time data from the KDS and POS. The Tableside AI Device 102 can be integrated with NFC payment readers powered by established processing companies to also receive payments 114. In this way, the invention introduces systems, methods, and computer program products in various embodiments to automate the guest's ordering journey in a restaurant.

Figure 2:
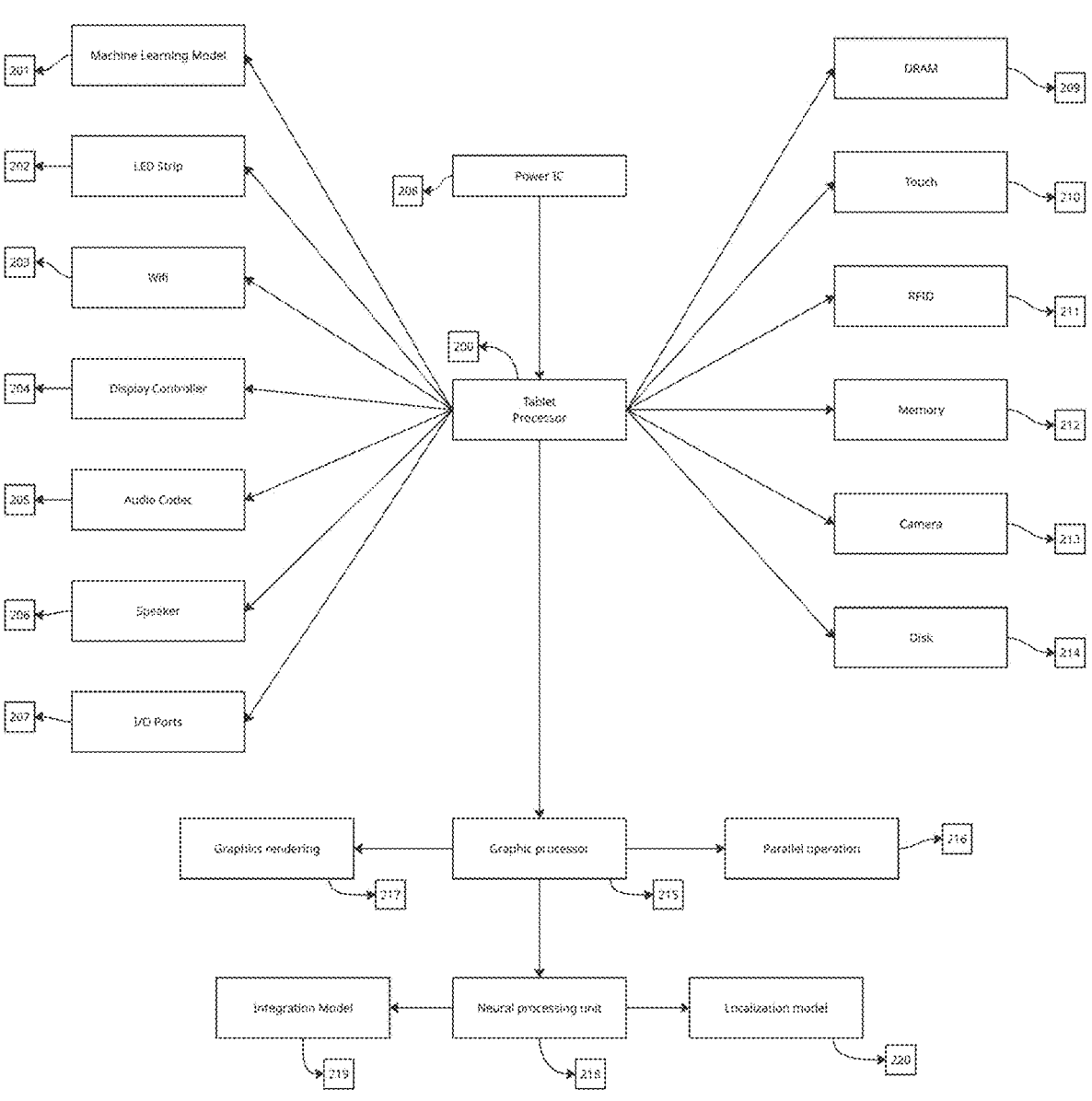
FIG. 2 identifies the Tableside AI Device and the various components tethered there along with their functionality.

FIG. 2 demonstrates the various components of the Tableside AI Device 102, which lies at the heart of the invention and orchestrates the operations of all other components tethered thereto. The Tablet Processor 200 forms an integral part of, and is the core processor in, the Tableside AI Device 102. Attached to the Tablet Processor 200 are the relevant sensors mentioned earlier. On the upper-left side, 201 represents the "Machine Learning Model", implying the tablet's capability to perform advanced computations using AI. The "LED strip" for customer engagement and response is attached at 202. The "WIFI" with Bluetooth module with 203, facilitates wireless connections to networks or devices. 204, the "Display Controller", manages how content is shown on the device's screen. 205 is the "Audio Codec", a vital component for managing sound by converting between digital and analog signals. 206 is the "Speaker" component to respond to the customer. At the lower-left corner, 207 represents the "I/O Ports", permitting connectivity with external devices and peripherals. In the center, 208 is the "Power IC" for power connectivity and charging. Transitioning to the right side, 209 stands for the "DRAM", a type of volatile memory known for its swift access times. 210 represents the "Touch" functionality, processing tactile interactions with the device. At 211 is the "RFID" to scan for the passive RFID tag on the table and prevent device theft or removal from the restaurant vicinity. 212 denotes the "Memory", non-volatile, storing user data and applications. 213 is the "Camera", the device's imaging module. 214 indicates the "Disk", symbolizing long-term storage, in the form of an SSD or similar storage mediums. The graphics processing 215 unit is responsible for all the graphics renderings 217 on the device with the help of parallel processing 216. Neural processing unit 218 is responsible for the computations that are related to neural networks and machine learning models. Localization model 220 is being used to capture and localize the users voice and different integration models 219 are running on NPU to enhance the user experience. The Tablet Processor 200 plays a significant role in cleaning or refining the audio and video data captured through the relevant sensors. The Tablet Processor's machine learning models 201 perform complex calculations, including but not limited to, Fast Fourier transformation to check the spectrum of the signal. These models assess the amplitude levels and calculate the precise delay that each audio signal took to reach the AI device making sure that refined data is transferred to the cloud.

Figure 3:
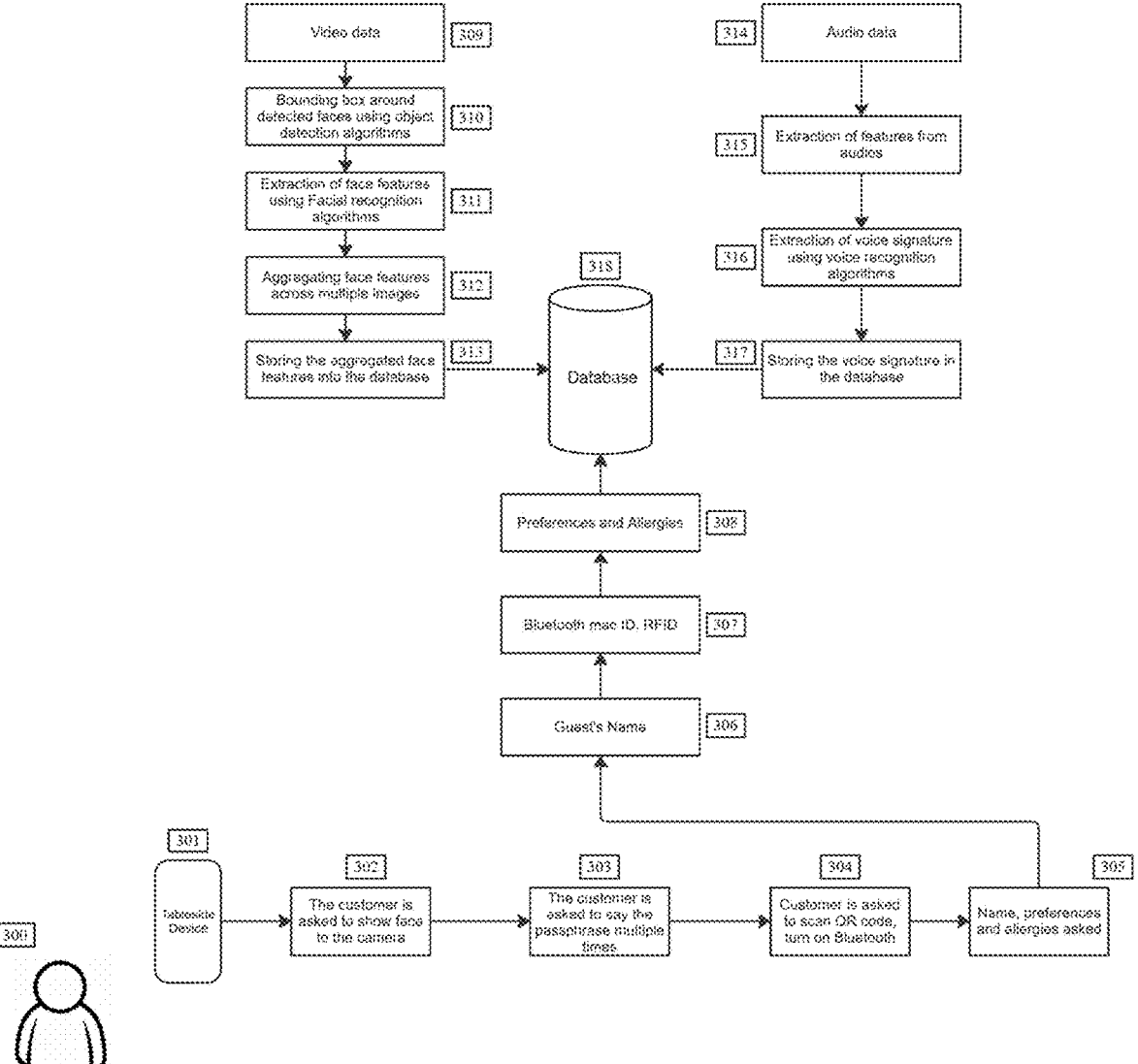
FIG. 3 illustrates the advanced new user's sign-up process and collection of various data from the customers including facial, audio, name, preferences, and hardware identifiers.

FIG. 3 illustrates the invention's ability to sign up new customers and extract various unique identifiers to recognize a customer upon return. The restaurant guest 300 is seated in front of the Tableside AI Device 301, embedded with advanced cameras and microphones. Guest 300 is asked by the Tableside AI Device 301 to show their face in camera 302; say a passphrase multiple times 303; scan the QR code, turn on Bluetooth 304; and state their name, food preferences, and allergies 305. Data pertaining to the guest's name 306; Bluetooth Mac ID or RFID 307 and guest's food preferences and allergies 308 are extracted, profiled, and then stored in database 318. Simultaneously, the video data is processed at 309 and audio data at 314. In video data at 309, bounding boxes are formed around the detected faces using object detection algorithms at 310. At 311, facial features are extracted using facial recognition algorithms and thereafter, at 312, face features across multiple images are aggregated. The aggregated facial features are then stored at 313 against the customer profile in the database 318. The audio data at 314 is processed for feature extractions at 315. At 316, voice recognition algorithms are deployed to extract voice signatures. The extracted features are then stored at 317 against the customer profile in database 318.

Figure 4:
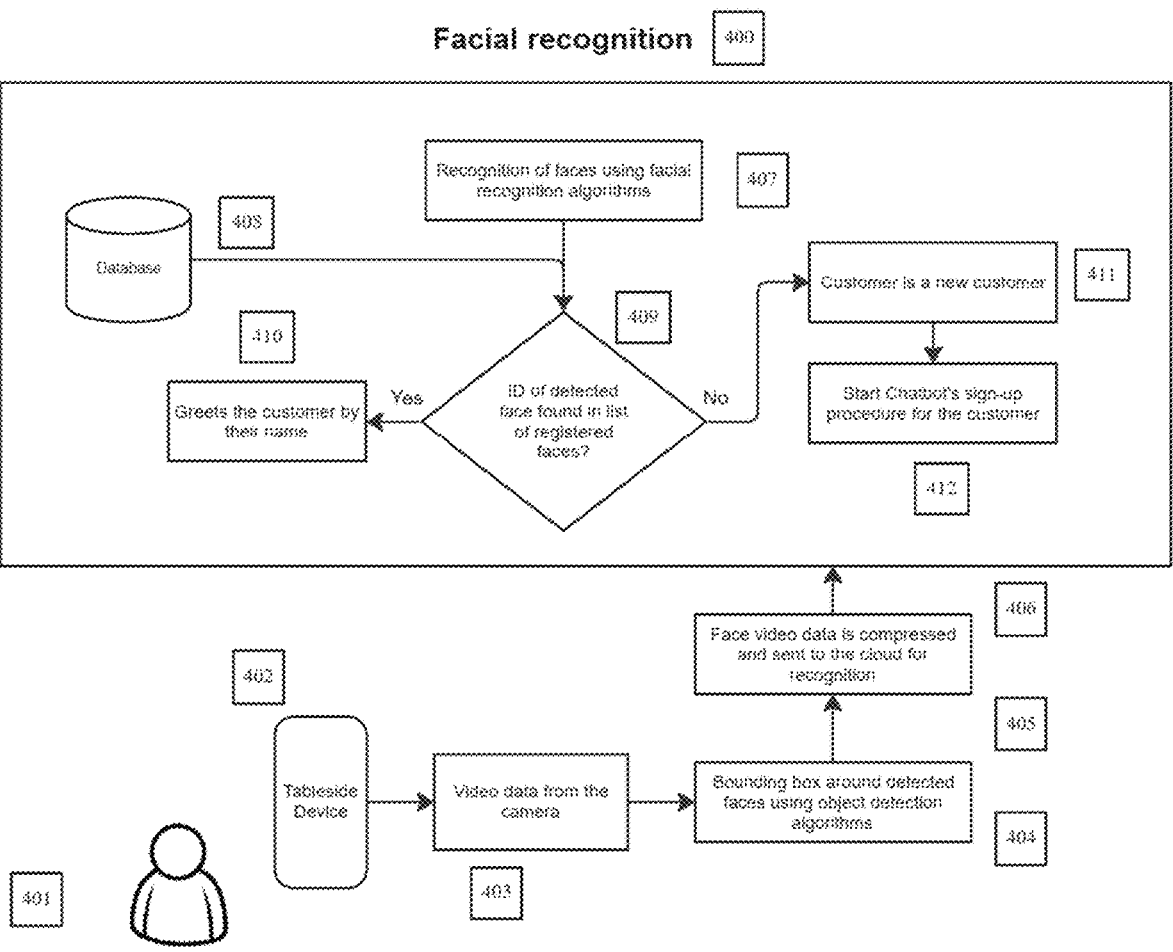
FIG. 4 presents the block diagram of the Face Recognition Module of the invention's Advanced Customer Recognition System.

FIG. 4 represents face recognition as the first component of the invention's Advanced Customer Recognition Module. The face recognition module 400 is capable of recognizing returning customers based on data stored during sign-up (either through the Device, QR code, or CRM). The restaurant guest 401 sits in front of the AI Device placed at the restaurant table 402. The camera(s) installed on the Tableside AI Device capture a video stream of guest 403 for facial recognition. On the Tableside AI Device 404 vision libraries like OpenCV will be used to detect and crop out the faces from the video stream by forming bounding boxes. At 405, the cropped facial data will be compressed using on-device libraries including but not limited to react-native-compressor. The compressed data will be sent to the cloud using MQTT, WebSocket, gRPC or similar protocols for further computation 406. Initially, on the cloud, the images will be queued in a stream processor like BullMq or Kafka, and the subsequent data will be fed into a facial recognition algorithm 407. The algorithm extracts unique facial features and thereafter runs the extracted features of the detected faces against database 408 containing the IDs of already registered faces. 409 determines whether features match an ID on the database. If the extracted features match with an ID on the database, the device recognizes the customer as returning 410, retrieves the customer profile, and greets the customer. If the features extracted fail to match the ID on the database, the customer is considered a new customer 411, and the sign-up process as disclosed in FIG. 3 hereinabove is initiated 412.

Figure 5:
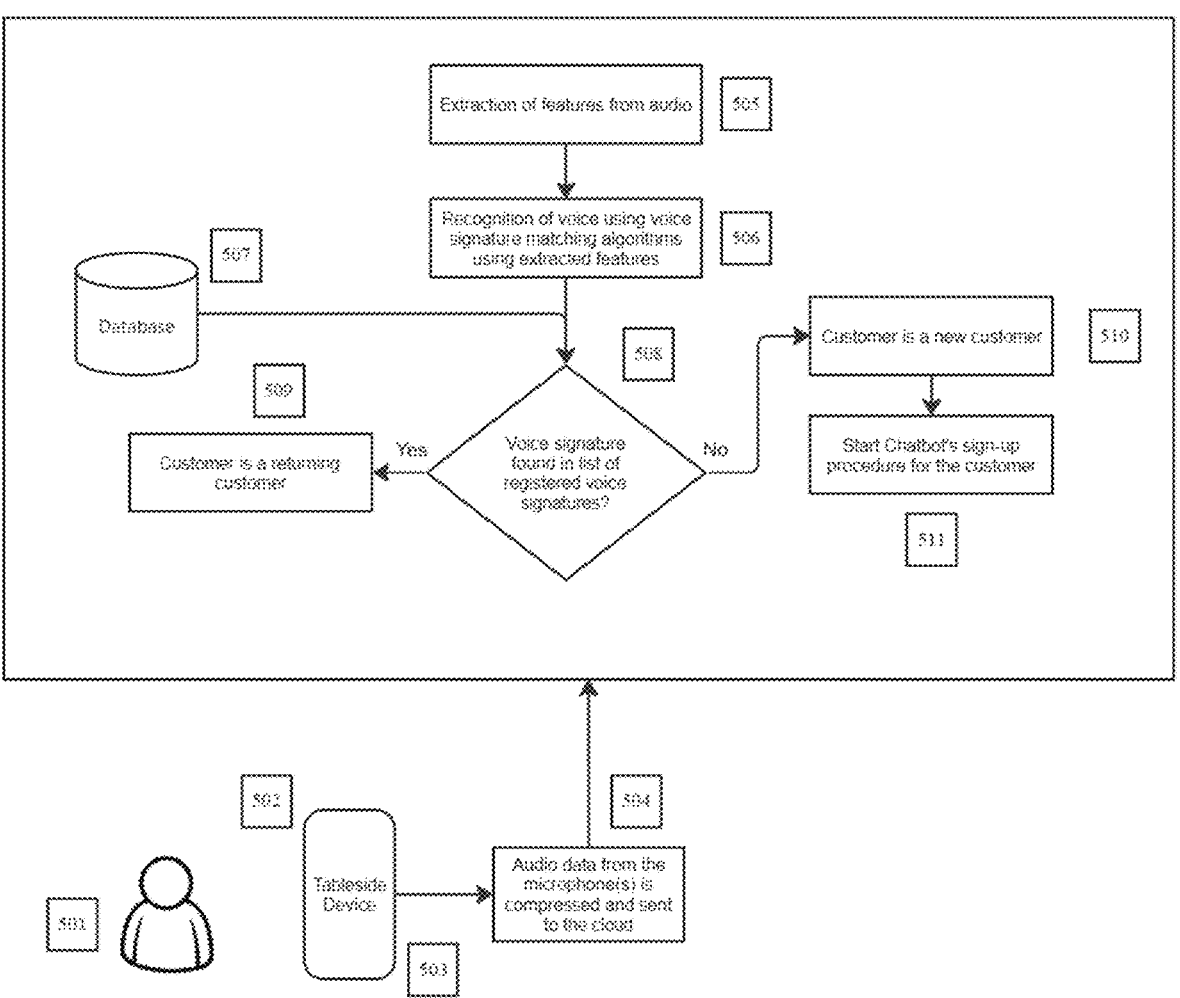
FIG. 5 presents the block diagram of the Voice Recognition Module of the invention's Advanced Customer Recognition System.

FIG. 5 represents voice recognition as the second component of the Advanced Customer Recognition Module. The voice recognition component 500 may be used independently or collectively with other modules of Advance Customer Recognition. The restaurant guest 501 sits in front of the Tableside AI Device 502 as placed at the restaurant table. The microphone(s) of the Tableside AI Device captures the voice data (speech) of customer 503, the device compresses the data and transfers it to the AI-powered cloud 504. On the cloud, features may be extracted from the audio signal 505 and a voice-matching algorithm, which without limitation may include Mel-Frequency Cepstral Coefficients (MFCCs), Deep Neural Networks (DNNs), Gaussian Mixture Models (GMMs), i-vectors, x-vectors, encoder decoder, transformer or Long Short-Term Memory (LSTM) Networks are applied 506. The features extracted are sent to the database 507 for comparison with voice data of the existing customer base and results are analyzed 508. In case the algorithm matches the voice with the database, the guest is identified as returning 509, greeted and their profile is retrieved for personalized guest experience. If the features extracted fail to match the available data on the database 510, the guest is new and the guest sign-up process as disclosed in FIG. 3 hereinabove is initiated 511.

Figure 6:
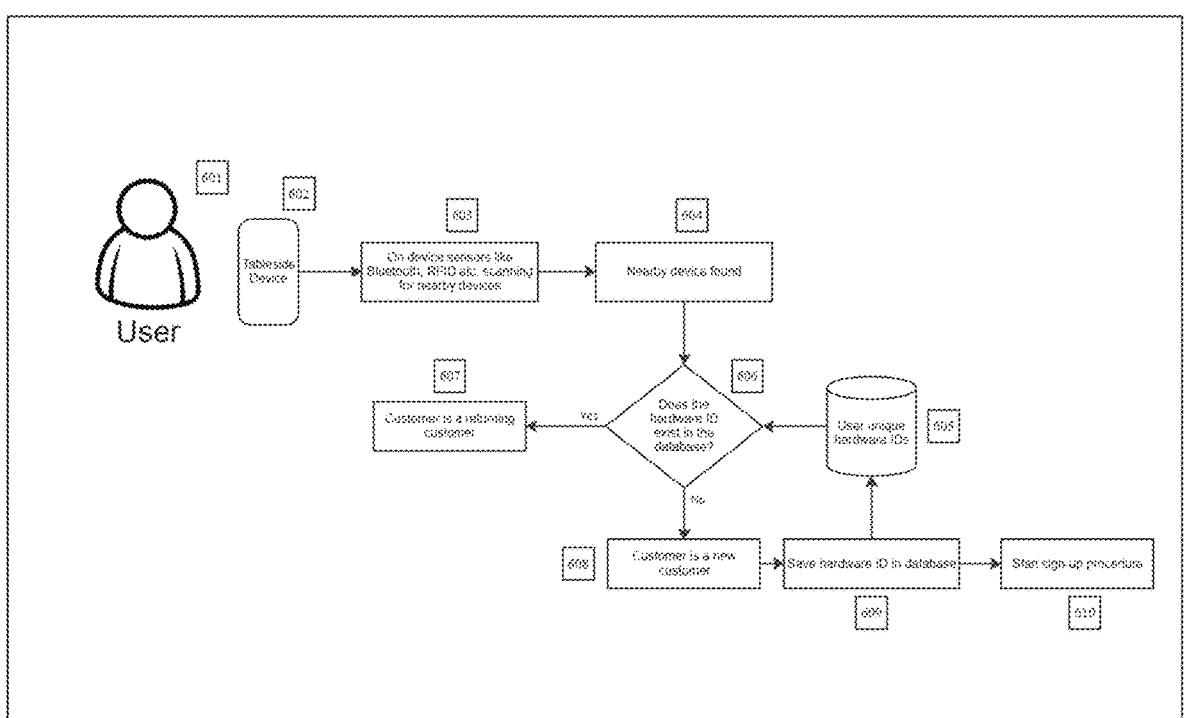
FIG. 6 presents the block diagram of the Device Recognition Module of the invention's Advanced Customer Recognition System.

FIG. 6 represents the device recognition components of the Advanced Customer Recognition Module. The Device Recognition component 600 may be used independently or collectively with other modules of Advanced Customer Recognition. Restaurant guest 601 sits in front of the Tableside AI Device 602. The Tableside AI device 602 is equipped with a comprehensive array of sensors including Bluetooth, RFID, and Wi-Fi, which scan for nearby smartphone devices 603 to capture their unique hardware identifiers, such as MAC addresses or any other distinctive identifier associated with the device or the customer. Depending on the proximity, the device utilizes different sensors for optimal detection. For close-range interactions, RFID technology is employed, while Bluetooth is utilized for longer-range detection. At 604, the Tableside AI Device captures a user's unique hardware ID and compares these IDs with those stored in the database against existing customer profiles 605. In the case of match 606, the customer is considered a returning customer 607 and their profile (linked with the hardware identifier) is extracted. If not, the customer is considered new 608 and the hardware ID is stored in database 609, which may be later attached with a customer's profile provided the customer signs up, otherwise same is discarded.

Figure 7:
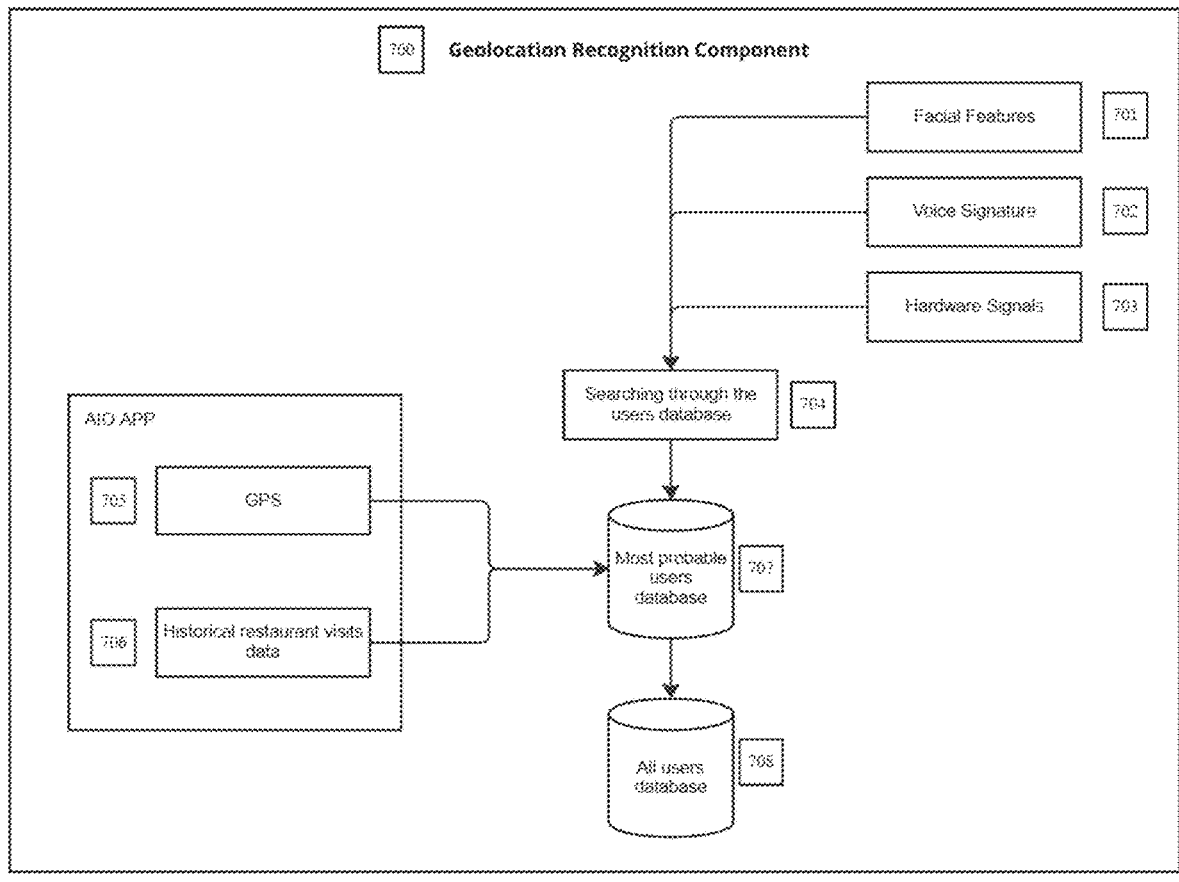
FIG. 7 illustrates the block diagram of the Geolocation Recognition Module of the invention's Advanced Customer Recognition System.

FIG. 7 represents the geolocation recognition components 700 of the Advanced Customer Recognition Module and its co-relation with other components. Geolocation component 700 and its correlation with other components for customer verification is an innovative approach to enhance face and voice authentication methods by leveraging supplementary data sources for optimizing search efficiency within a vector database or similar structure. By incorporating contextual information such as the user's GPS coordinates, historical visit patterns, and other relevant contextual data, the search process is refined to prioritize potential matches from the database. After comparing a guest's facial features 701, voice signature 702 and hardware signals 703 through the database 704, the system takes into account GPS data 705 and historical restaurant visit data of the guest 706 to match with the most probable user database 707 against all user database 708. This optimization strategy significantly reduces computational overhead and enhances the accuracy of authentication, as it narrows down the search to customers most likely to be present at a given location or scenario. Furthermore, by dynamically adjusting search parameters based on real-time contextual cues, the system adapts to varying conditions, ensuring robust and reliable authentication performance across diverse environments.

Figure 8:
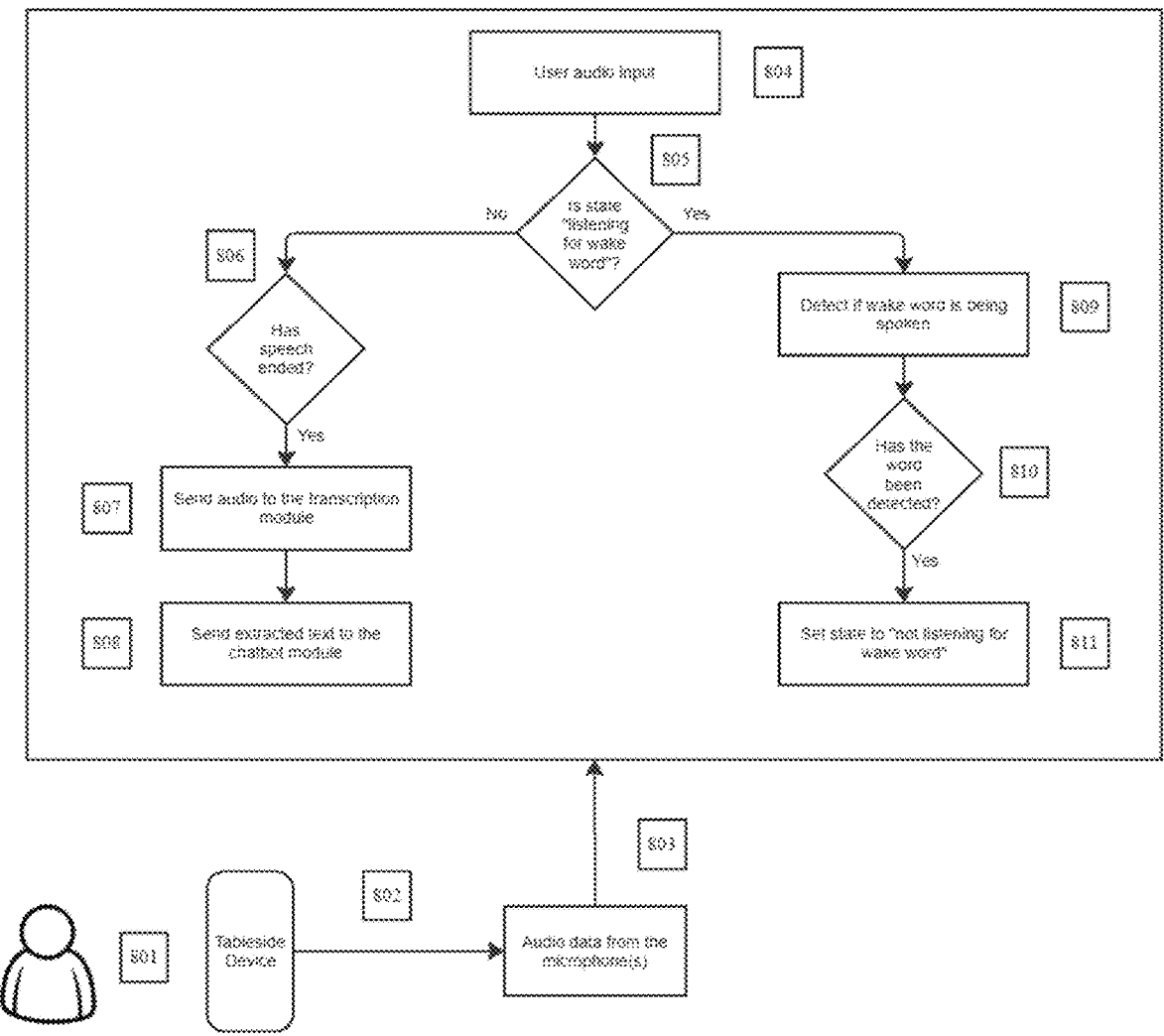
FIG. 8 shows the Speech Pathway Module of the invention's AI-enabled Speech Recognition and Response System.

FIG. 8 illustrates the component of the invention's advanced AI-enabled Speech Recognition and Response system. 800 represents the Speech Pathway Module. The captured audio data (speech) from user 801 through the Tableside AI Device is compressed 802 and transferred to cloud 803 for computation. Alternatively, the computation may take place on the premises or on the Tableside AI Device. But for the consideration of the present disclosure, the same is computed, without limitation, on the cloud. The device state detection variables deployed at 805 determine whether the Tableside AI Device is in the 'listening for wake word' state. If the Tableside AI Device at 805 is not in a 'listening to wake-word state', the data at 804 is transferred to the Transcription Module. The silence detection code at 806—as a prerequisite to sending data to the Transcription Module—detects whether speech has ended. The silence detection code may be an audio or audio features AI model, a voice activity detection instruction or model, or an implemented logic to identify end of speech in audio using raw audio data or features extracted from the audio data. If the end of speech is detected, the audio data is transferred to the Transcription Module 807. Additionally, at set intervals, audio data is sent in chunks to a transcription module, which returns a partial transcription. This transcription is then analyzed to determine whether the content is relevant to the domain, contains actionable instructions, or is irrelevant. If deemed relevant, audio data transmission continues; otherwise, the device may switch to an idle state and stop listening. The extracted textual data is then sent to the Chatbot Module at 808. If the Tableside AI Device at 805 is in the 'listening for wake word state', the data at 804 is transferred to the Wake-word Module. If after passing through the Wake-word Module, the Wake-word is detected, the device again enters into 'not listening to wake word' state 811, and all audio data received thereafter moves through the Transcription Module and Chatbot Module, respectively.

Figure 9:
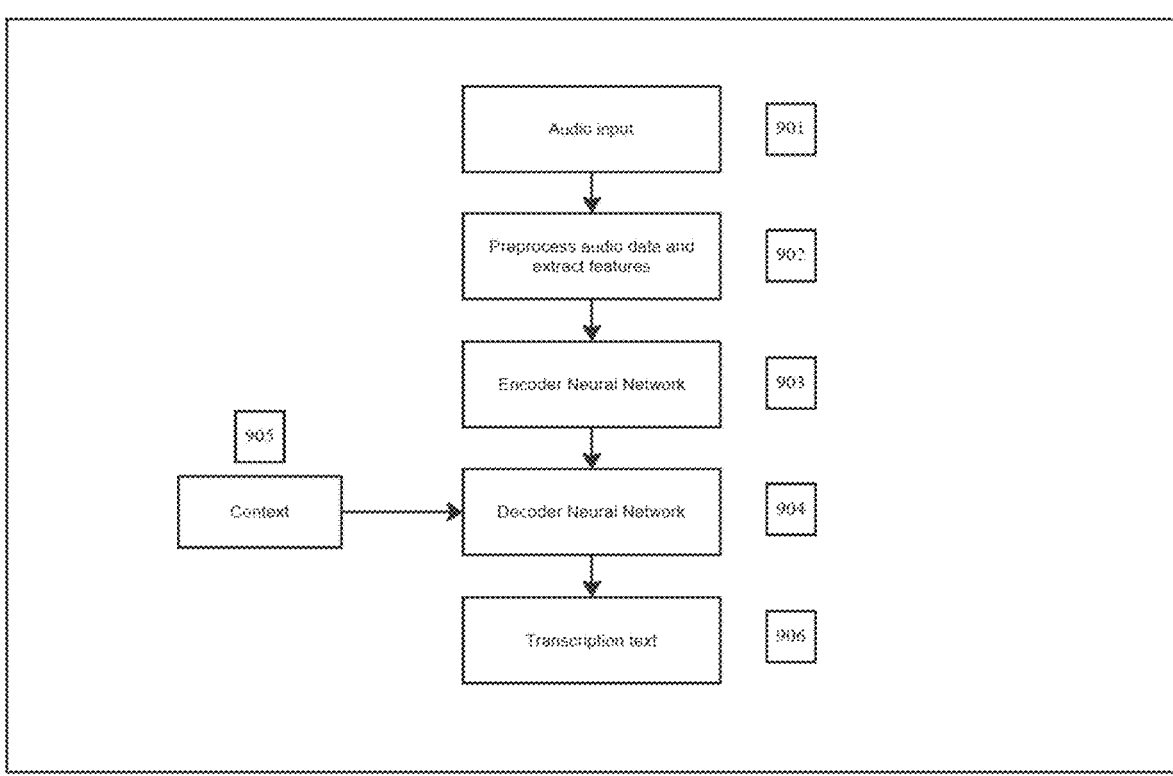
FIG. 9. is the Transcription Module of the invention's AI-enabled Speech Recognition and Response System.

FIG. 9 represents the Transcription Module of the Speech Pathway Module. The Transcription Module 900 converts the audio data to text for further processing. The first step in the seriatim is that the audio data received at 806 is pre-processed at 901 in various ways, including but not limited to, trimming, noise removal, or other similar manner. At 902, various audio features may be extracted using different techniques including but not limited to, Mel-Frequency Cepstral Coefficient (MFCC), Mel Spectrogram, Short-Term Fourier Transform (STFT), Fast Fourier Transform (FFT), Discrete Fourier Transform (DFT), or any other audio feature. The features extracted at 902 pass through the Encoder Neural Network model 903 to encode and transform the inputs into an intermediary state and then processed through the Decoder Neural Network model 904. At 904, various additional contexts from 905 in the form of text or text embeddings are inserted to make the transcriptions accurate, domain-specific, and high-quality. The Decoder Neural Network model, after inserting context, processes these inputs, cleans and applies other post-processing to the audio data, and finally transcribes the same to text at 906 for further processing vide the Chatbot Module.

Figure 10:
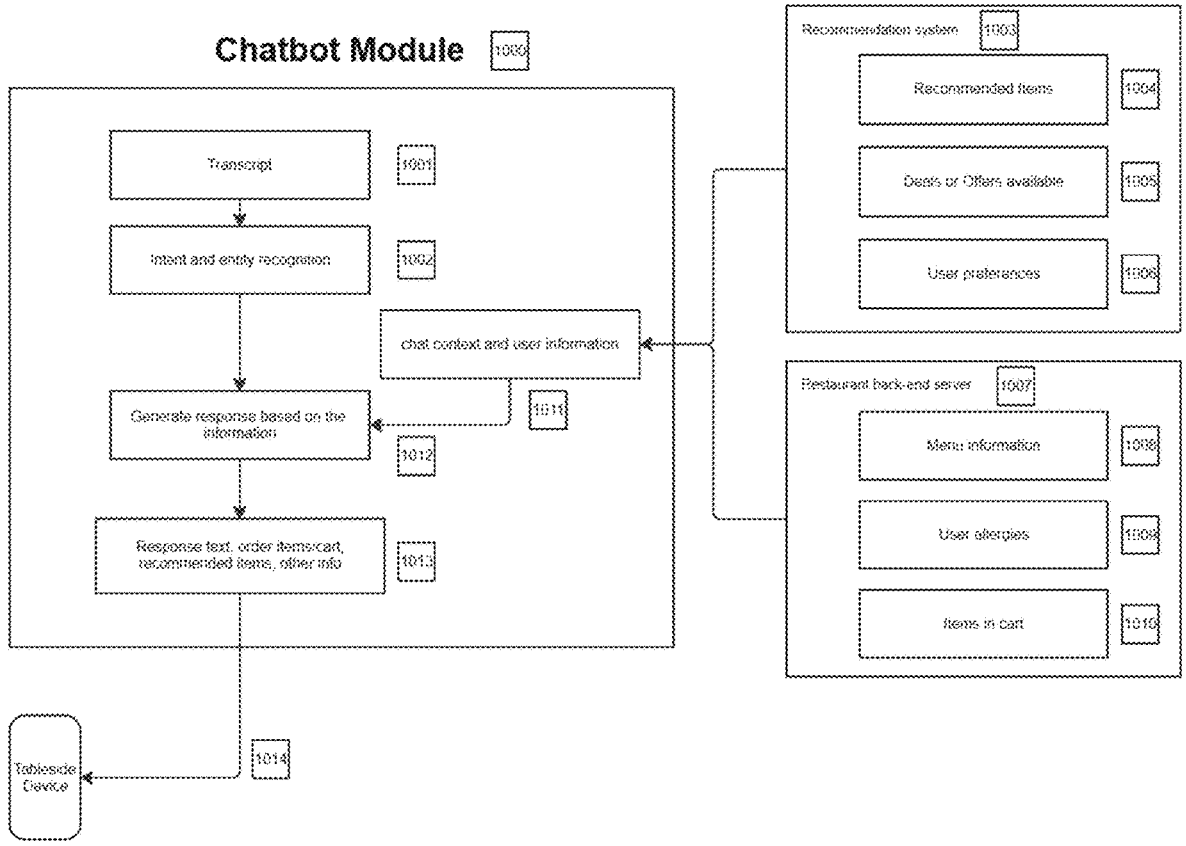
FIG. 10 represents the Chatbot Module of the invention's AI-enabled Speech Recognition and Response System.

FIG. 10 represents the Chatbot Module 1000 of the Speech Pathway Component. The speech-to-text data or transcribed data of 906 is received in FIG. 10 at 1001. At 1002, intent and entity are recognized using the Intent and Entity Recognition Module 1100. The response from the Intent and Entity Recognition Module is amalgamated with data churned from the Recommendation System 1003 and Restaurant back-end server 1007 to generate a relevant response. As a high-end process (more details in FIG. 15), contextual data such as recommended items 1004; deals or offers 1005; user preference 1006; menu information 1008; user allergies 1009 and items in cart 1010 used to determine the guest's input and a response is generated at 1012. The response is then converted to action i.e. text, addition or removal of item from the cart, recommend items or call the server, etc., at 1013 and displayed on the Tableside AI Device at 1014 and the device proceeds to listening state to gather audio data for transcription again till silence detection is triggered by a voice activity detection model 806 stored on the device.

Figure 11:
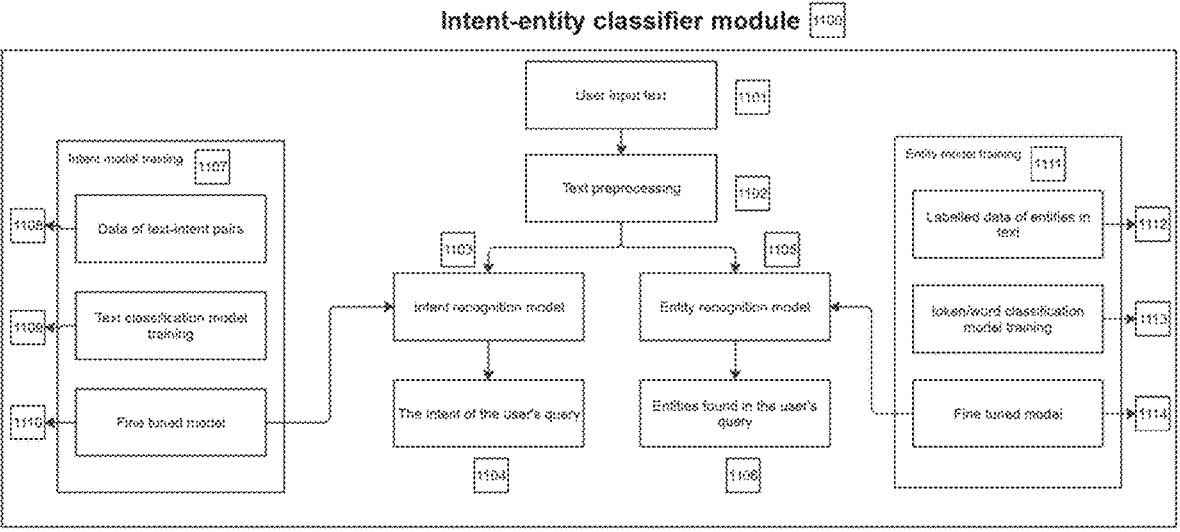
FIG. 11 illustrates the Intent-Entity Classifier Module of the invention's AI-enabled Speech Recognition and Response System.

FIG. 11 delineates the intricate process of deciphering user intents and extracting relevant entities at 1002 of the Chatbot Module 1000 using the Intent-Entity Classifier Module 1100. Here, the user input text at 1101—transcribed at 1001—undergoes a preprocessing sequence at 1102 performing tasks such as punctuation removal, capitalization, standardization, and spelling correction, etc., to ensure uniformity and accuracy in subsequent analysis. Following this preprocessing, the text traverses through both an intent classification model 1103 and an entity recognition model 1105. Using these models the user's intent 1104 and the entities 1106 in the text are extracted. 1107 explains the training of the Intent Recognition Model 1103. The training procedure involves preparing a dataset of text-intent pairs 1108. The dataset is fed to a text classification model training pipeline 1109 that returns the fine-tuned intent recognition model 1110 at the end. Likewise, 1111 represents the training process of Entity Recognition Model 1105. Here labeled data of entities in text 1112 is transferred to a token or word classification training procedure 1113, resulting in a fine-tuned entity recognition classification model 1114.

Figure 12:
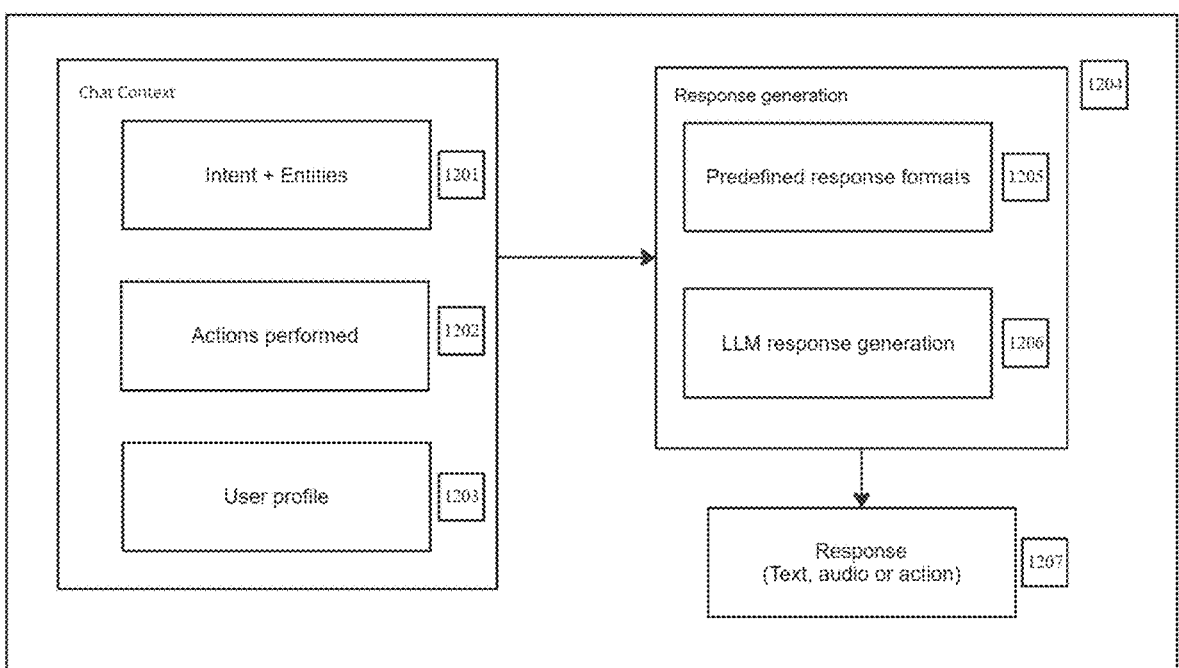
FIG. 12 shows the Response Module of the invention's AI-enabled Speech Recognition and Response System.

FIG. 12 represents an overview of the Response Module 1200 to generate a response at 1012 and 1013 of the Chatbot Module 1100. The response generation module 1200 leverages data of user intent and extracted entities 1201, performed actions 1202 for the user (such as modification or recording of an order), and user profile details 1203, such as preferences, allergens, past orders, etc., to generate a response. At 1204, the module employs diverse text generation techniques, including fixed templates 1205 and large language model (LLM)—or any other method within natural language processing (NLP)—to craft tailored responses, ensuring personalized and contextually relevant interactions with users. The response to the user's audio data can be in text, audio, or action 1207 depending on the guest's speech input. For example, if the guest asks about ingredients in a menu item, the response can be in text or audio. If, on the other hand, the user asks to add a drink to the order, such a response will be in action i.e. addition of drink to the order.

Figure 13:
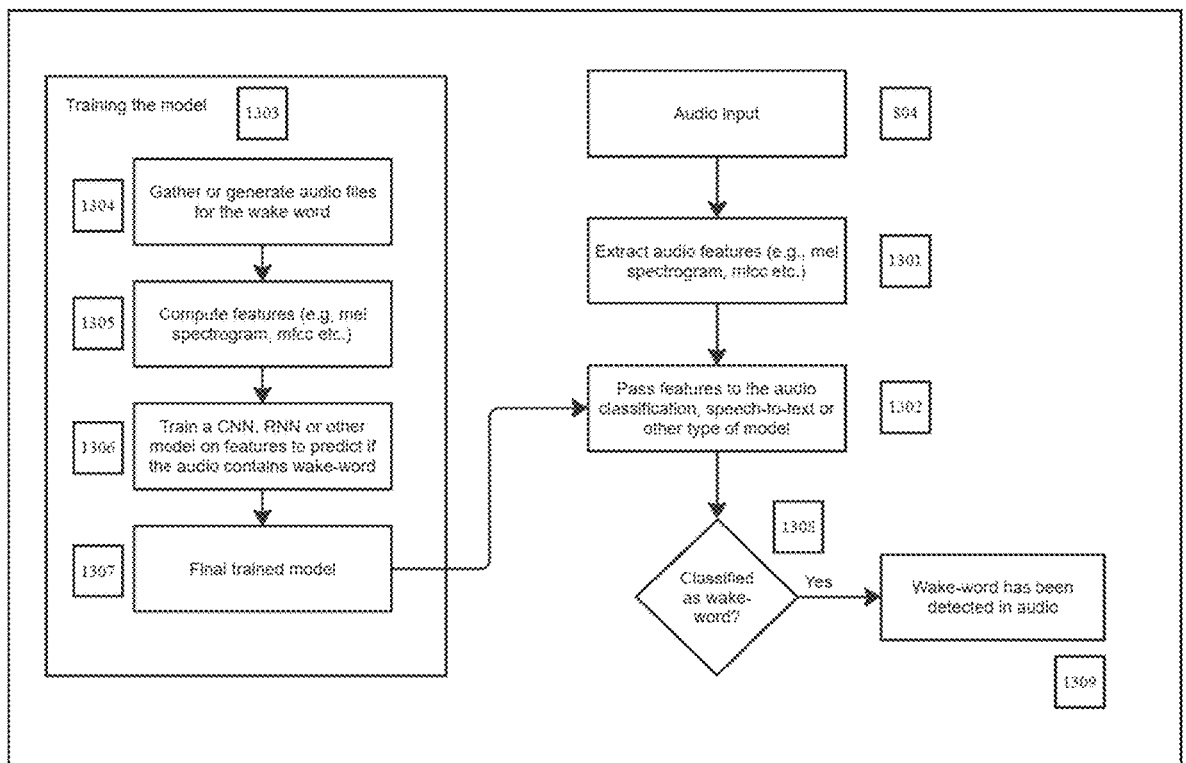
FIG. 13 identifies the Wake-word/Hot-word Module of the invention's AI-enabled Speech Recognition and Response System.

FIG. 13 represents the Wake-word Module 1300 used to recognize the wake-word at 809 of Speech Pathway Module 800. A wake word is a word or a phrase that prompts the Tableside AI Device into a listening and processing state. At the heart of the Wake-word Module lies either the Wake-word recognition model or Keyword spotting model 1307. 1303 represents the training of the Wake-word recognition model 1307. The training process is initiated at 1304 by gathering or generating audio files that contain the wake-word phrase to train the model against that data using techniques such as data augmentation. Features are extracted at 1305 from these audio files using techniques such as Mel Spectrogram, MFCC, STFT, or other similar audio feature extraction techniques. The features extracted at 1305 are passed onto the audio model for training at 1306. The audio model may be a purely audio-based model, an image model such as CNN, or models that employ CNN, a mixture of both, or any other image-based network for the task of image classification. A speech-to-text model may also be trained and used to find references to the wake-word phrase in the audio. After training, the final model 1307 may be used for the detection of wake word. The audio data of the guest (or speech) at 804 passes through a feature extraction stage at 1301. These features may be one of those mentioned before or similar thereto. These features are passed on at 1302 through audio classification, speech-to-text (STT) or the wake-word recognition model 1307 to detect the wake word 1308. If the wake word is detected, the Speech Module 800 sets to 'Not Listening for Wake Word' state 811. All subsequent audio data of guest (or speech) moves through 807 and 808 of the Speech Module 800.

Figure 14:
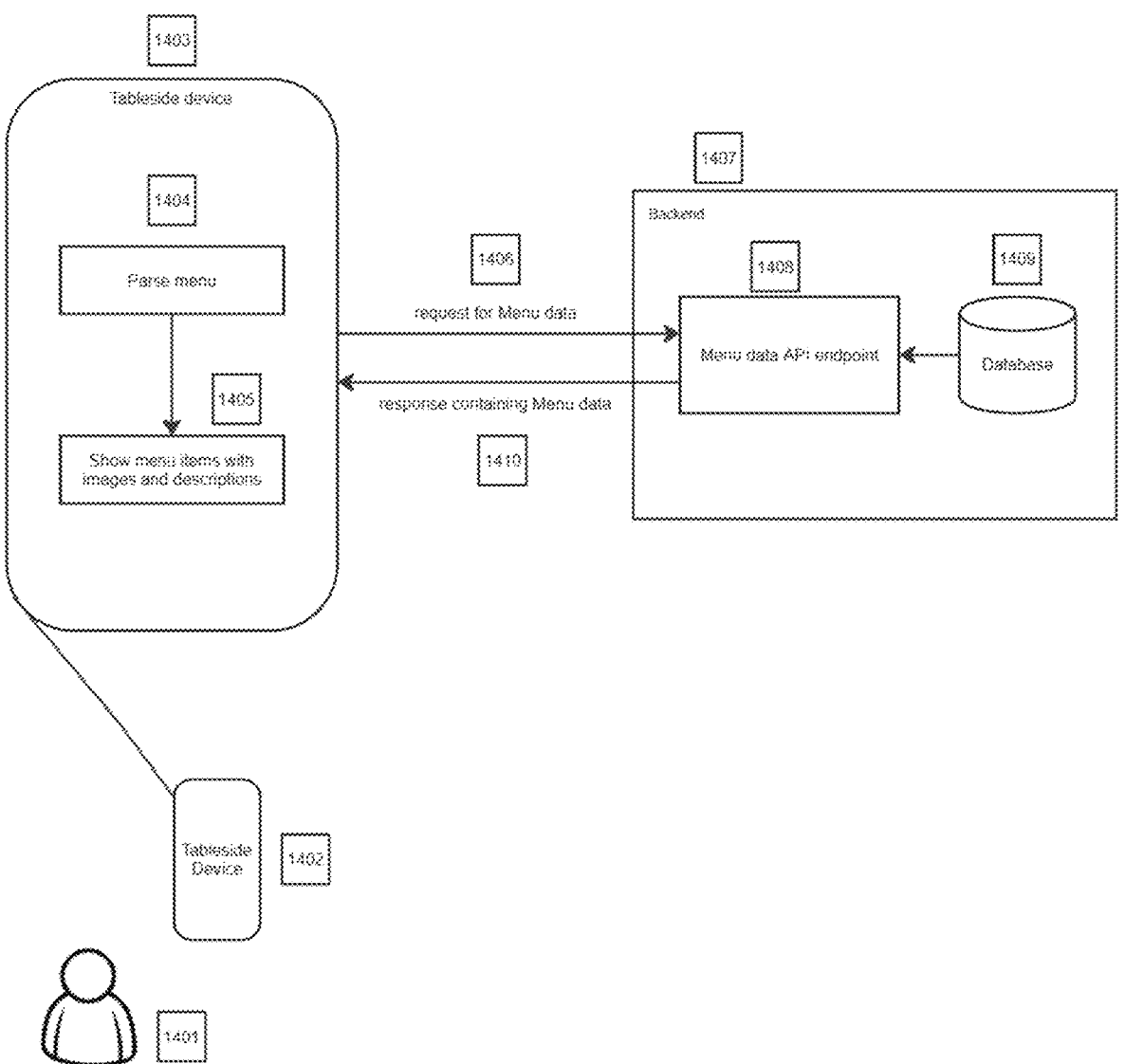
FIG. 14 represents the invention's ability to fetch and display the high-definition menu from the backend onto the Tableside AI Device.

FIG. 14 shows a process of retrieval of the menu from the backend database and its representation on the Tableside AI Device 1402. Here 1403 is the enlarged view of 1402 which with parse menu 1403 displayed. When a user 1401 chooses the menu option (through audio or touch), the request for menu data 1406 is transferred to the backend 1407 using a protocol such as RestAPI, MQTT, gRPC or any such protocol 1408. The endpoint in the backend 1407 may send cached menu data or communicate with a data store such as database 1409 to send updated menu data back to the Tableside AI Device via the endpoint 1410. The menu data may include but is not limited to item names, descriptions, images, tags, allergen and other information 1405. The menu may be in a "ready to be displayed" state or may need to be parsed in order to be understood by the Tableside AI Device. After this, the Tableside AI Device 1402 may show the menu items along with other required information including but not limited to images and description of the items.

At the heart of the system lies the AI-enabled Recommendation Engine empowered to make personalized recommendations to restaurant guests based on guest's preferences, order history, and allergies. This Engine also takes real-time, is capable of making personalized recommendations for guests based on past orders, allergies or preferences, or the popularity of items, weather, guest mood, and time of the day.

Figure 15:
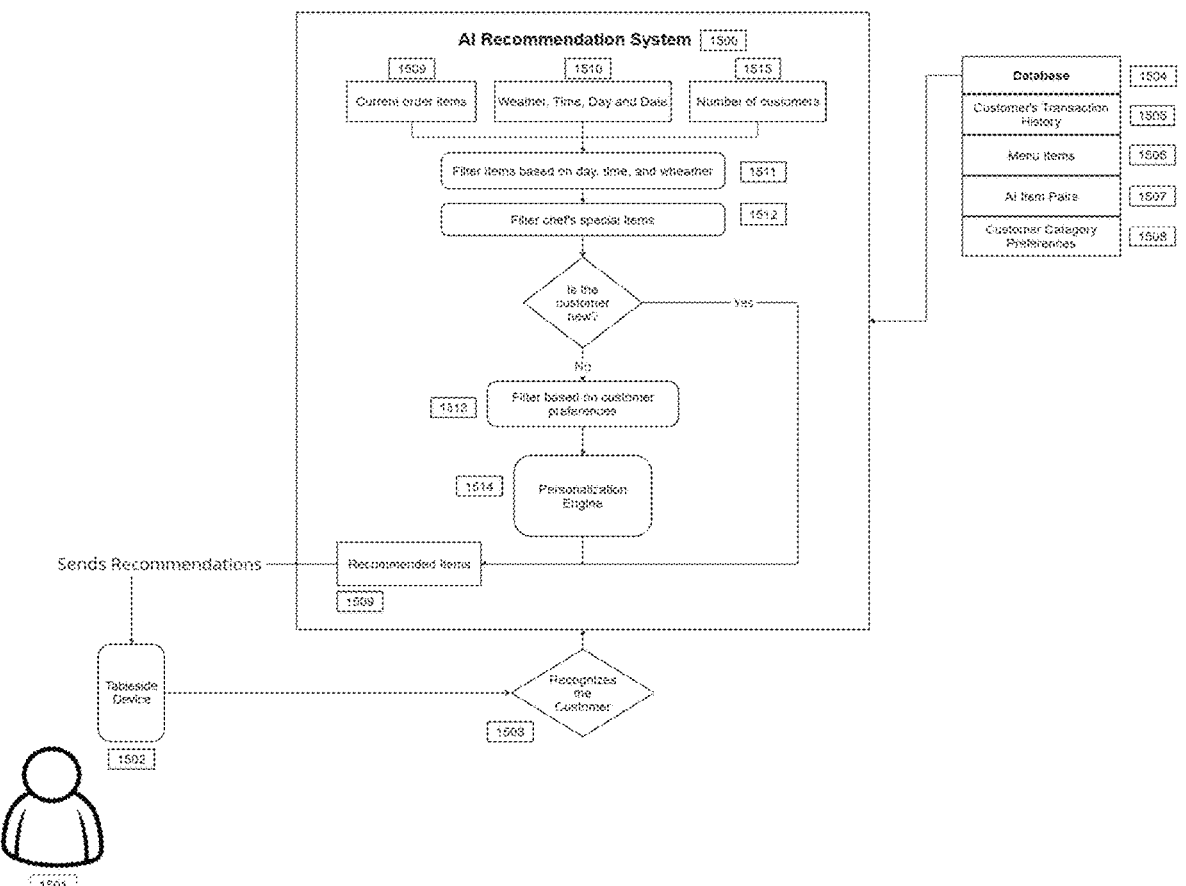
FIG. 15 is an overview of the functionality of the AI-enabled Recommendation System with various data points as input data and the relevant processes to render the final recommendations.

In FIG. 15, 1500 represents the AI-Enabled Recommendation System. Customer 1501 interacts with the Tableside AI Device 1502. The Tableside AI Device 1502 recognizes customer 1503. If the customer is recognized, the recommendation system will recommend based on the customer's behavior. To achieve this goal of showing recommendations to new and old customers, all the necessary information is extracted from the Tableside AI Device 1502 and the database 1504. That information from database 1504 contains the customer's ticket history 1505, items in the menu 1506, AI item pairs 1507, and customer's category preferences 1508. The rest of the information is the current items in the order list 1509 and the weather information e.g. (temperature, overcast, forecast), time of the day, day of the week, and other relevant information 1510 that would help the recommendation system make intelligent decisions. The next step of the recommendation process is filtering items from the menu based on categories suitable for that specific weather, time, and day 1511. Thereafter, the items labeled 'chef's favorite', 'chef's recommendation', or 'chef's special', are extracted from the menu 1512. If the customer is already registered, the customer preferences are the final filter 1513 before the items are sent to the personalization engine 1514. The customer's transaction history is the ticket history of a registered customer 1505. The menu items 1506 are all individual items listed by the owner of the restaurant. The AI item pairs 1507 are pairs brought together based on how whether they're labeled "logical" to be sold together. The second item of the pair is the recommended item which is sent back to the Tableside AI Device 1502. In case groups of three to four customers (or less), are seated in front of the Tableside AI Device 1502, the system recommends deals suited for groups commensurate with the headcount 1515.

Figure 16:
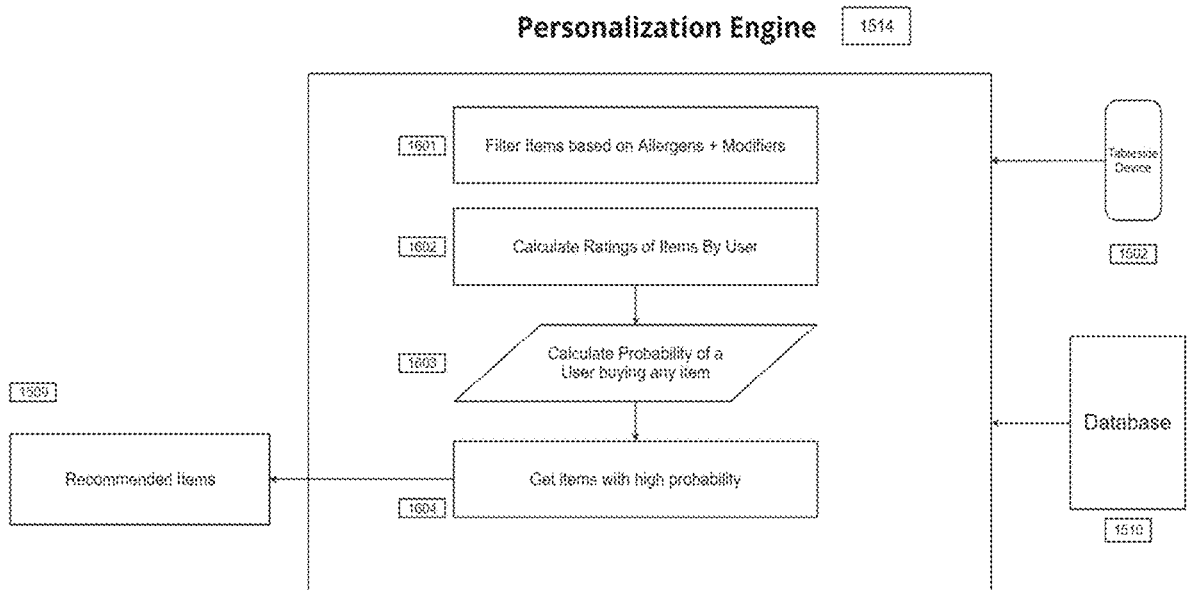
FIG. 16 illustrates the function and process of the Personalization Engine, forming as essential part of the invention's AI-enable Recommendation System.

FIG. 16 is a block diagram of the functionality of the Personalization Engine 1514, an integral and vital part of the invention's Recommendation System. Tableside AI Device 1502 sends selected items by a specific user to the Personalization Engine 1514. The engine checks if the user has specified any allergens or modifiers 1601. Then, the engine calculates ratings of items given by user 1602 i.e. a rating is considered "5/5" if a customer has bought an item more than "K" amount of times. This "K" value was set by the owner of the restaurant in 1602. If the value of K is set to "3", then even if the customer does not rate the item, the selection is considered a "5/5" if the customer purchases the item more than "3" times. This calculation is based on when a customer executes a new transaction. The system at 1603 calculates the probability of a user buying an item based on how much a category is liked by the customer. Given all rated items in the database against a customer, an average can be calculated. For example, a rating of a customer let's say is "5/5" for some item "item-1" and "3/5" for another item "item-2" of the same category, one can calculate the overall rating as "4/5". Now, if an item is in more than one category, a dot product can be calculated from the customer's categories rating vector and the item's category availability vector.

FIG. 17 shows the equation to calculate probabilities for recommendation at 1603. For example, there are three (3) categories (C1, C2, C3), users (U1, U2, U3), and items (I1, 12, I3). Let's say, I1 belongs to C1 and C2, then vector V1 becomes [1,1,0]12 belongs to C2 then vector V1 becomes [0,1,0]I3 belongs to C3 then vector V1 becomes [0,0,1] and for a specific user U1, U1 rates C1=60%, C2=20%, and C3=20% To calculate the probability of a person buying an item I1 would be the dot product of V1 with probabilities of U1 and in return we'll have the final probability i.e. 80%. Once we have the probabilities, we can suggest pairs from the highest probability 1604 and push them to the recommended items.

Figure 18:
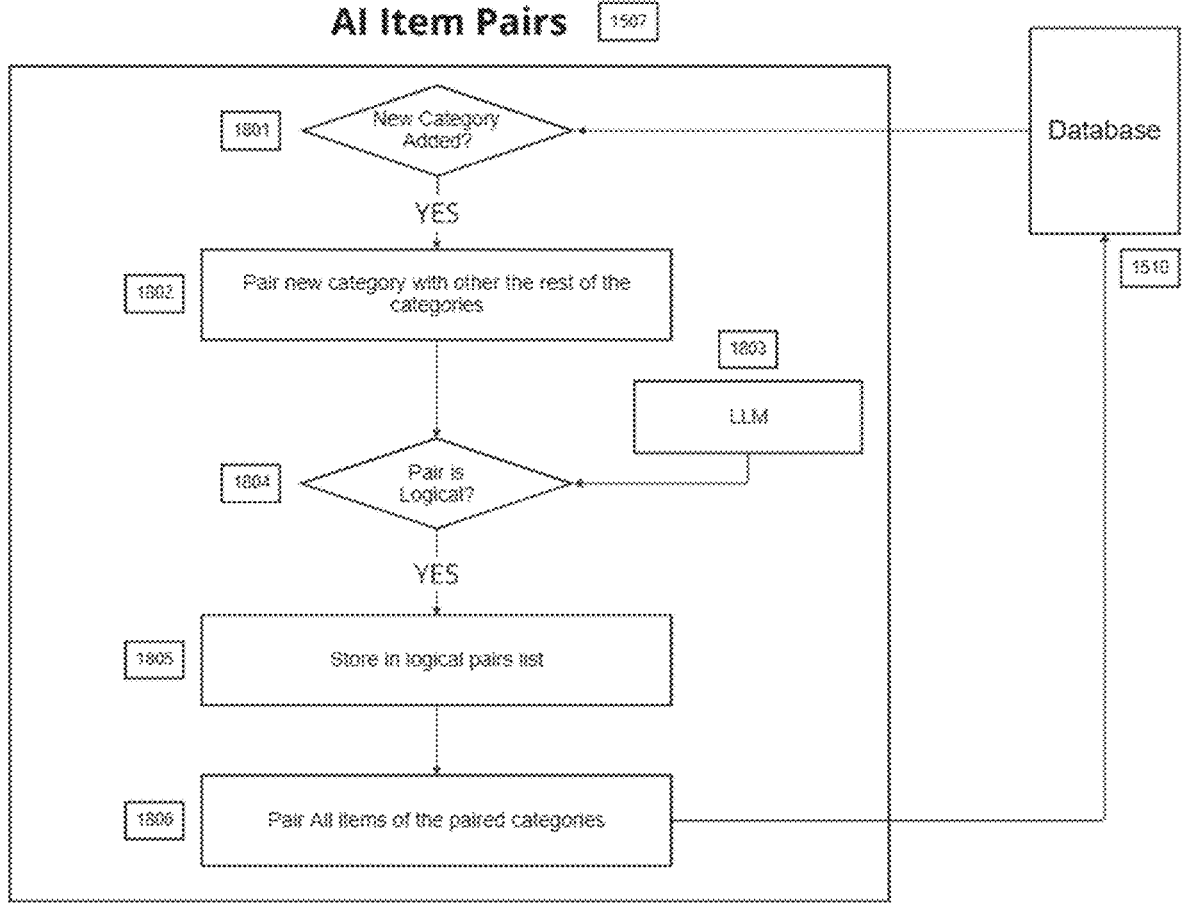
FIG. 18 represents the functions and processes involved in AI item pairing deployed by the AI-enabled Recommendation System.

FIG. 18 represents the technical process at the AI pairs section 1507 of the Advance AI Recommendation System 1500. All items from database 1510 are brought together. Pairs are created only when a new category is added or an old one is updated 1801. The next step is to create all pairs of the categories 1802. Then, the AI compares the categories e.g. "Breakfast" to "Dinner" using an LLM (Large Language Model) 1803. It labels the pair as logical or illogical; in the case of breakfast and dinner, it would conclude it as illogical. After creating pairs of logical categories, all items in those categories are combined together to create AI pairs 1804. These pairs of categories are used to pair all the items in the menu from those categories 1805. These pairs are called AI Item pairs which are then stored back in the database 1806.

Figure 19:
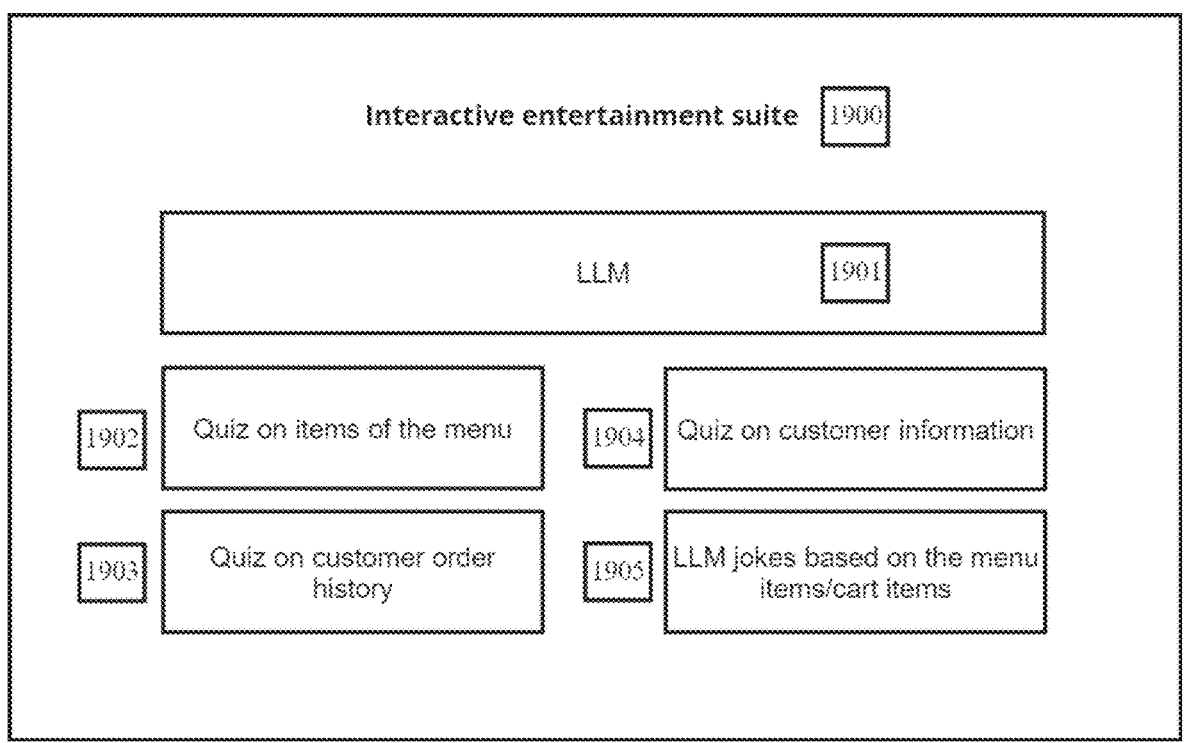
FIG. 19 shows the Tableside AI Devices' ability to be used for user engagement by gamification of the experience.

FIG. 19 represents Tableside AI's Interactive Entertainment Suite 1900. This suite 1900 leverages LLM-based 1902 to generate trivia quizzes based on items of the menu 1902, customer information 1904, and order history 1903. Additionally, it incorporates other LLM-based engagements such as jokes and poems 1905.

Figure 20:
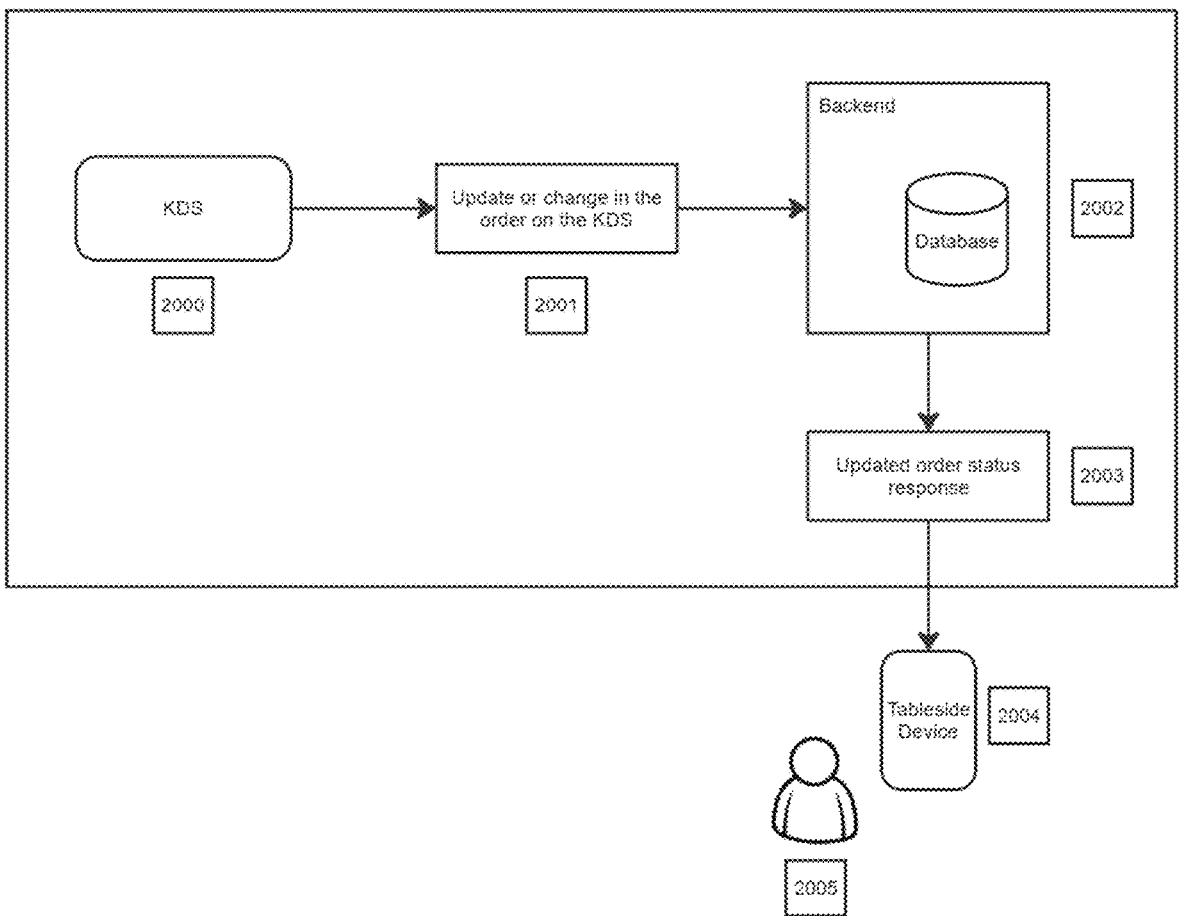
FIG. 20 is the invention's capability to provide real-time alerts to guests for example for order updates and payments.

FIG. 20 represents the invention's ability to display, and apprise the restaurant guest, in real-time about their order's status and updates. The process of sending order updates initiates from the kitchen display (KDS) 2000. The order status changes on the KDS 2001 when the server, chef, or manager updates the order status by tagging individual items as statuses such as "being prepared", "done", or any similar status. This change updates the status of the order in the backend database 2002. Thereafter, the order status is updated 2003. The updating of the status may invoke a mechanism to inform other devices of the update. This mechanism may be a publish-subscribe mechanism such as MQTT or some other mechanism including but not limited to RestAPI to notify the relevant devices with updates. The updated order status may be sent to the tableside device using any mechanism or protocol 2003. The display on the tableside 2004 may update to reflect the order status or provide a textual or audio response may notify of the update on the tableside device to the customer 2005.

It is claimed:

1. A tableside artificially intelligent (AI) customer engagement system, comprising:
   a processing subsystem including one or more tablet processors configured to perform data processing, one or more memory units, one or more input devices, and one or more input/output devices, each configured to communicate with the others;
   a high-definition multi-touch display for interactive user interface;
   a Wi-Fi module supporting low-latency, multi-node connectivity across mesh devices;

a microphone array configured to capture audio data in a full radius;

a set of high-definition cameras providing 360-degree panoramic coverage for capturing video data;

an RFID reader for device monitoring and security;

an NFC payment card reader for detecting and processing payment transactions from compatible payment instruments;

a customer recognition module configured to process a plurality of customer recognition datasets collected from a plurality of sensors and wherein the module is further configured to analyze the said datasets using one or more recognition models to identify a returning customer;

a speech recognition and response unit configured to transcribe speech to text to determine intent and entities and generate context aware responses;

a personalized recommendation module configured to analyze a plurality of datasets using AI models to generate personalized menu items recommendations;

a backend database configured to store and manage a plurality of datasets with a caching module that selectively retrieves either cached or freshly updated menu data based on availability;

a fulfillment terminal communication interface configured to relay order and payment information to and from a connected fulfillment terminal or kitchen display system in real-time;

a secure communication interface to facilitate data exchange between the backend and the tableside AI device;

a central cloud processor and storage system configured to host and execute AI models remotely and store relevant data; and a detachable wireless charging pad supporting up to 15 Watts of wireless charging for compatible devices.

2. The system of claim 1, wherein the customer recognition models of the customer recognition module include facial feature extraction from captured video data, voice feature extraction from captured audio data, and hardware identifier detection via QR code, Wi-Fi, or Bluetooth, integrated with a geolocation module to improve customer identification accuracy.

3. The system of claim 1, wherein the natural language processing and response unit further comprises of a transcription module configured to convert speech into text and a chatbot module integrated with a large language model (LLM) to generate context-aware responses.

4. The system of claim 3, wherein the transcription module further comprises:

an audio preprocessing unit configured to trim and remove noise from the captured audio data;

a voice feature extraction module configured to extract voice features from the said audio data;

an encoder neural network to convert the said extracted features into fixed-sized vectors or encoded representations of the most important aspect of the said extracted features; and a decoder neural network to transform the said fixed-sized vectors or encoded representations into transcribed text.

5. The system of claim 3, wherein the chatbot module further comprises:

an intent and entity recognition module configured to analyze the transcribed text to determine user intent and identify relevant entities;

a chat context unit configured to store and integrate a plurality of datasets including data from the backend database, data in transit at recommendation engine, items in the cart, customer data, restaurant establishment data and real-time input data; and a response generation module to integrate the identified intent and entities and context from the plurality of datasets in the chat context unit using AI models to produce context-aware responses wherein the AI models include large language models (LLM), natural language processing (NLP), sequence-to-sequence models, or other machine learning architectures.

6. The system of claim 5, wherein the intent and entity recognition module further comprising:

a text pre-processing unit configured to streamline text generated by the transcription module;

an intent recognition model trained on text-intent pairs and text classification data and fine-tuned to determine customer intent; and an entity recognition model trained on labeled entity data, token classification, and word classification, and fine-tuned to identify entities within the audio data.

7. The system of claim 1, wherein the advanced AI personalized recommendation System, further comprises:

a specialized database configured to store and retrieve a plurality of datasets collected from one or more sensors;

a data analysis and filtering module for processing and filtering the said stored datasets against real-time data inputs;

a ranking module integrated with predictive AI models to rank items based on real-time input data and the datasets stored in the specialized database; and a personalization engine configured to generate personalized recommendations based on the said analysis, menu filtering and item ranking and wherein the personalization engine is further configured to verify the customer-selected items for allergens, dietary preferences, and user-defined modifiers by querying associated metadata against stored customer data via a secure communication interface.

8. The system of claim 7, wherein the plurality of datasets stored in the specialized database comprises:

restaurant establishment data including menu items, promotional items, and restaurant specialties;

contextual data including geolocation, weather, time, day, date, calendar events, and seasonal data retrieved via APIs; and customer data, including customer order history, preferences, allergies, and personal information collected from one or more connected systems.

9. A method for artificially intelligent tableside customer engagement, comprising:

detecting a wake word using deep learning-based wake word recognition or keyword spotting, wherein audio input is continuously monitored through a microphone array for wake word detection and thereby transitioning the system to a listening and processing state upon detecting the said wake word;

triggering a plurality of sensors to gather input data the said sensors including microphone, camera, hardware identifier of customer's devices and geotagging and wherein the said input data includes video data, audio data, hardware identity data of customer's devices and location history;

extracting facial features and vocal features of a customer from the captured video and audio data respectively using face detection and voice detection models and comparing the extracted face and voice features with customer data stored in the database to identify a returning customer;

comparing the collected unique hardware identifiers data of the customer's devices and geolocation data with the data stored in the database under the customer's profile for enhanced customer recognition;

retrieving profile of a returning customer stored in the database, and greeting the customer;

signing up a new customer by creating a unique customer profile using predeterminate templates and said input data;

displaying available menu items from restaurant establishment data on a display device;

processing customer's natural language input via natural language processing and transcribing the said input into text by a transcription module thereby classifying the intent and entity through an intent and entity recognition of the chatbot module to generate context-aware responses;

providing personalized menu recommendations to the customer based on AI models, the said AI models processing a plurality of data sets including customer profile data, restaurant establishment data, contextual data, and real-time input data for generating personalized recommendations;

transmitting the said personalized order information to a fulfillment terminal or kitchen display system in real-time;

re-transmitting the real-time updates from the fulfillment terminal or Kitchen Display System to the connected tableside system; and relaying the said order information and payment details from the centrally integrated point-of-sale system to the connected tableside system.

10. The method of claim 9, wherein the available menu items are retrieved from the backend database and displayed on the user interface in response to a customer-initiated selection and wherein the said selection could be via an audio input or touch input.

11. The method of claim 10, wherein retrieving available menu items from the backend database further comprises of selecting either cached menu data or freshly updated menu data wherein the freshly updated menu data includes current menu items, pricing, availability, and dietary information and wherein the said retrieved menu items are parsed using a structured format and rendered on a user interface for interaction.

12. The method of claim 9, further comprising:

generating personalized customer engagement content using large language models (LLMs), wherein the LLMs process a plurality of datasets to personalize the said customer engagement content and wherein the said datasets include customer data, historical interaction data, and contextual data, and wherein the content is further displayed on the user interface for interaction.

13. The method of claim 9, wherein processing customer's natural language input further comprising:

determining whether the device is in a "listening for wake word" state using device state detection, and, if the device is not in the "listening for wake word" state, transferring the audio data to a transcription module that processes the audio in chunks at set intervals and generates partial transcriptions.

14. The method of claim 13, further comprising detecting the end of speech using a silence detection code, wherein the silence detection code utilizes an AI model, voice activity detection model, or logic to identify the end of speech within raw audio data or extracted features, and upon detecting the end of speech, transferring the audio data to the transcription module for processing.

15. The method of claim 9, wherein transcribing natural language voice input into text, further comprises:

extracting audio features from the natural language input through Natural Language Processing (NLP);

transforming the most relevant extracted features of the said input into fixed-sized vectors or encoded representation through an encoder neural network;

transcribing the transformed fixed-sized vectors or encoded representations into text through a decoder neural network; and applying text normalization and cleaning to the transcribed text for usage by the chatbot module.

16. The method of claim 15, wherein partial transcriptions are generated from the audio snippets collected at set intervals to determine if the said collected audio contains domain-relevant content, actionable instructions, or irrelevant information wherein the audio data transmission continues if relevant, or the device transitions to an idle state to stop listening if irrelevant.

17. The method of claim 9, wherein generating context-aware responses by the chatbot module, further comprises:

ingesting the transcribed text to determine the intent and entity from the natural language input using an intent and entity recognition module;

aggregating contextual data from a plurality of sources wherein the sources include the backend database, data in transit at the recommendation engine, items in the cart, contextual data, customer data, restaurant establishment data, and real time input data; and generating a response based on the analysis of said aggregated contextual data using AI models wherein the AI models may include large language models (LLM), natural language processing (NLP), sequence-to-sequence models, or other machine learning architectures.

18. The method of claim 17, wherein the intent and entity recognition of the chatbot module further comprises:

pre-processing the text generated by the transcription module through a pre-processing unit;

determining customer intent from the transcribed text using intent recognition models trained on text-intent pairs and fine-tuned for text classification; and determining entities within the transcribed text using entity recognition models trained on labeled entity data including token and word classification and fine-tuned for recognition through voice data.

19. The method of claim 17, wherein the restaurant establishment data includes, the menu items of the restaurant, the promotional items, and the specialties of the restaurant collected by, injected through, or ingested by a point-of-sale system at the restaurant establishment or backend database.

20. The method of claim 17, wherein the contextual data comprises data on geolocation, weather, time, day, date, calendar events, and seasons fetched through APIs.

21. The method of claim 17, wherein customer data comprises the customer's order history, preferences, allergies, and personal information collected through a point-of-sale system at a restaurant establishment or stored in the backend database.

22. The method of claim 17, wherein the generated response may be executed as an action including modifying a user interface, updating an order, triggering a service request or performing another system action and displaying the result on the user interface of connected output device.

23. The method of claim 9, further comprising:

collecting encrypted payment data through a plurality of wireless payment technologies;

transmitting the said encrypted data via a secure communication protocol; and processing payment using a secure element to perform cryptographic operations, tokenization, and key management, in compliance with applicable security standards.

24. The method of claim 9, wherein generating AI based personalized menu recommendations, further comprises:

filtering and ranking menu items by analyzing a plurality of datasets including real-time input data, customer data, restaurant establishment data, and contextual data, using a filtering and ranking module integrated with predictive AI models to generate personalized menu items recommendations;

generating group offers for a group of customers by analyzing the size of the customer group from the input data gathered from a plurality of sensors along with the analysis of said datasets to recommend tailored offers for the group of customers; and displaying the personalized recommendations and group offers on the user interface.

25. The method of claim 24, wherein personalization of menu items for recommendation further comprises of utilizing AI models to pair existing menu items with the most likely choice of the customer based on predictive analysis of a plurality of datasets including customer data, restaurant establishment data, contextual data, and real-time input data.

26. The method of claim 24, wherein the customer-selected items are transmitted to a personalization engine to verify the said selected items for allergens, dietary preferences and user-defined modifiers by querying metadata associated with the said selected items against the customer data stored in the database via a secure communication interface.

27. The method of claim 24, wherein personalization of menu items for recommendation further comprises of calculating menu items relevance for a customer based on the customer's transaction history stored as part of the customer's profile data in the backend database wherein the menu items with frequent purchases or interactions exceeding a predefined threshold are ranked according to a configurable scale defined by the restaurant establishment.

28. The method of claim 24, wherein personalization of menu items for recommendation further comprises of estimating the probability of menu items selection using a category-based preference algorithm, the said algorithm applying weighted preferences derived from the customer data stored in the database and wherein the said customer data includes customer's order history, preferences, contextual factors, and real-time inputs.

29. The method of claim 24, wherein personalization of menu items for recommendation further comprises of generating a personalized recommendation score for menu items associated with multiple categories by performing a dot product calculation between the customer's category preference vector and the item's category vector.

30. The method of claim 24, wherein personalization of menu items for recommendation further comprises of extracting menu item data from the backend database via a query interface and generating item pairings in response to updates or additions of categories to the said menu and wherein large language models (LLMs) compare menu item categories by analyzing semantic relationships between attributes.

31. The method of claim 30, wherein menu item pairings are labeled as compatible or incompatible based on the evaluation of the semantic relationships between category attributes and their compatibility.

32. The method of claim 30, wherein compatible menu items are combined to form AI-generated menu item pairings and wherein the said AI generated menu item pairings re stored in the backend database in a structured format for subsequent retrieval and recommendation purposes.

\* \* \* \* \*